United States Patent
Yamamoto et al.

(10) Patent No.: US 7,969,842 B2
(45) Date of Patent: Jun. 28, 2011

(54) PLAYBACK DEVICE AND MANAGEMENT INFORMATION ACQUIRING METHOD

(75) Inventors: Masaaki Yamamoto, Tokyo (JP); Atsushi Ishimaru, Tokyo (JP); Kenji Yorimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 568 days.

(21) Appl. No.: 12/053,180

(22) Filed: Mar. 21, 2008

(65) Prior Publication Data
US 2008/0304383 A1 Dec. 11, 2008

(30) Foreign Application Priority Data

May 11, 2007 (JP) ................................ 2007-126255

(51) Int. Cl.
*G11B 5/58* (2006.01)

(52) U.S. Cl. .................................................. 369/53.17
(58) Field of Classification Search ............... 369/53.17, 369/47.1, 47.14, 47.27, 47.39, 53.2
See application file for complete search history.

(56) References Cited

U.S. PATENT DOCUMENTS

2006/0044979 A1* 3/2006 Kuraoka et al. ............ 369/53.17
2006/0087943 A1 4/2006 Kuraoka et al.

FOREIGN PATENT DOCUMENTS

| JP | 2006-85859 | 3/2006 |
| JP | 2006-114107 | 4/2006 |

* cited by examiner

*Primary Examiner* — Joseph Haley
*Assistant Examiner* — Nicholas Lee
(74) *Attorney, Agent, or Firm* — Oblon, Spivak, McClelland, Maier & Neustadt, L.L.P.

(57) ABSTRACT

A playback device includes a reading section that performs reading from a recording medium, and a control section that acquires the latest temporary management information recorded last on the recording medium. The control section executes a read control process of controlling the reading section so that when reading pointer information in a temporary management information unit recorded last in a temporary management information unit recording area, reading of data is executed from a predetermined position located before a segment in which the pointer information is included, and an information acquiring process of executing a process for acquiring the temporary management information pointed to by the pointer information from the data read in response to the read control process.

4 Claims, 21 Drawing Sheets

FIG. 3

DMA

| Cluster Number | Contents | Number of Clusters |
|---|---|---|
| 1 to 4 | DDS (same DDS repeatedly four times) | 4 |
| 5 to 8 | DFL#1 | 4 |
| 9 to 12 | DFL#2 (same contents as #1) | 4 |
| 13 to 16 | DFL#3 (same contents as #1) | 4 |
| 17 to 20 | DFL#4 (same contents as #1) | 4 |
| 21 to 24 | DFL#5 (same contents as #1) | 4 |
| 25 to 28 | DFL#6 (same contents as #1) | 4 |
| 29 to 32 | DFL#7 (same contents as #1) | 4 |

32 CLUSTERS

FIG. 4
DDS (DISC DEFINITION STRUCTURE)

| Data Frame Number | Byte position | Contents | Number of bytes |
|---|---|---|---|
| 0 | 0 | DDS identifier = "DS" | 2 |
| 0 | 2 | DDS format number | 1 |
| 0 | 3 | Reserved (00h) | 1 |
| 0 | 4 | DDS Update Count (= serial number of last TDDS) | 4 |
| 0 | 8 | Reserved (00h) | 8 |
| 0 | 16 | First Physical Sector Number of Drive Area in DMA | 4 |
| 0 | 20 | Reserved (00h) | 4 |
| 0 | 24 | First Physical Sector Number of Defect List in DMA | 4 |
| 0 | 28 | Reserved (00h) | 4 |
| 0 | 32 | First Physical Sector Number of User Data Area | 4 |
| 0 | 36 | Last Logical Sector Number of User Data Area | 4 |
| 0 | 40 | Size of first-layer Inner Spare Area (ISA0) | 4 |
| 0 | 44 | Size of Outer Spare Area (OSA0, OSA1) | 4 |
| 0 | 48 | Size of second-layer Inner Spare Area (ISA1) | 4 |
| 0 | 52 | Spare Area Full flags | 1 |
| 0 | 53 | Reserved (00h) | 1 |
| 0 | 54 | Disc Certification flags | 1 |
| 0 | 55 | Reserved (00h) | 1 |
| 0 | 56 | Last Verified Address Pointer | 4 |
| 0 ... 31 | 60 ... 2047 | Reserved (00h) | |

1 SECTOR (2048 BYTES)

1 CLUSTER (32 SECTORS (32 FRAMES))

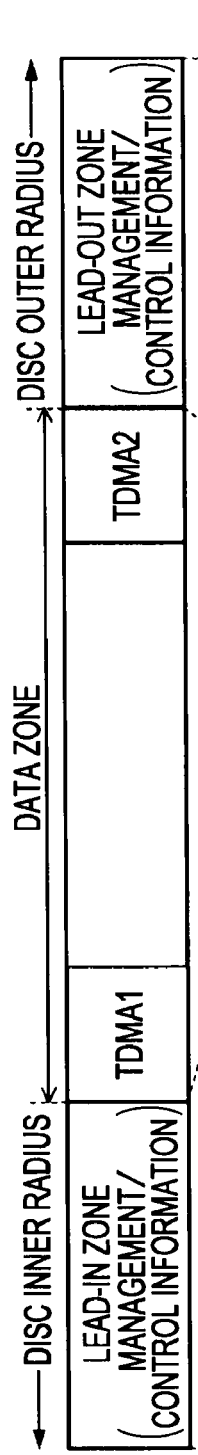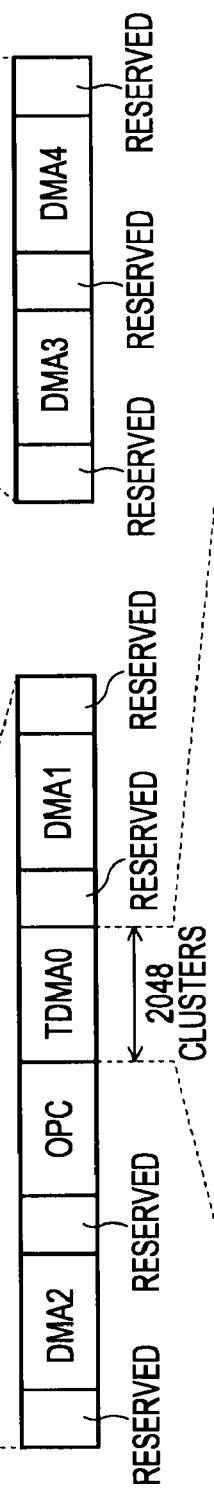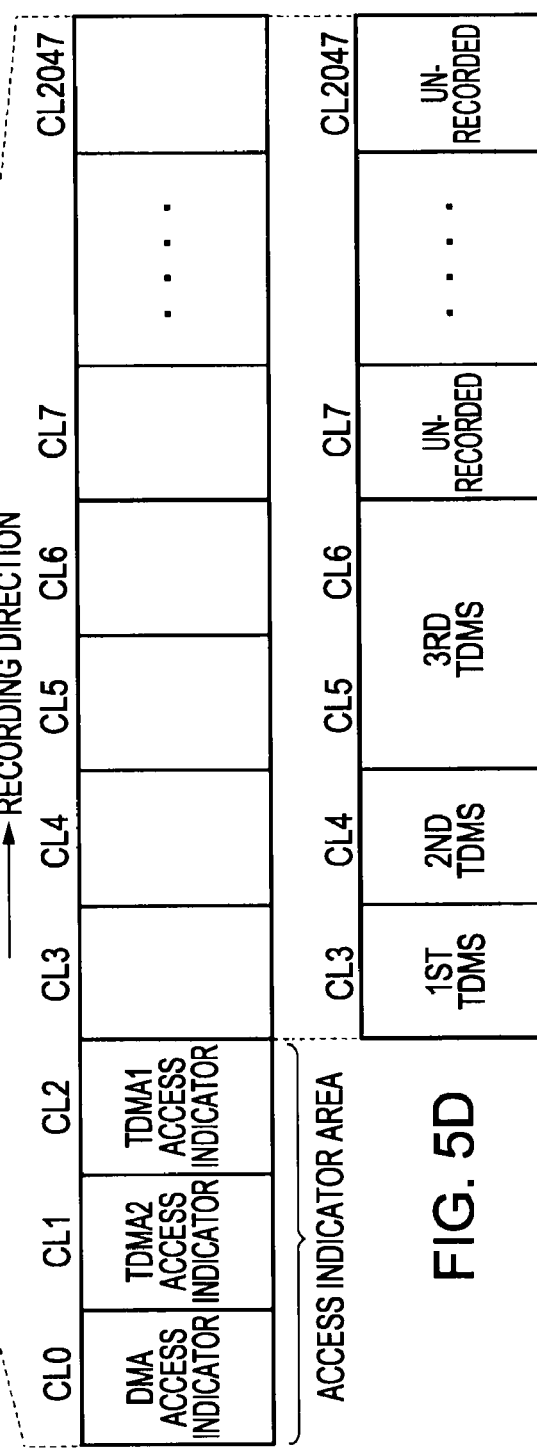
FIG. 5A  FIG. 5B  FIG. 5C  FIG. 5D

TDMS UPDATE UNIT LAYOUT

FIG. 6A  SRRI + TDDS

| Cluster | Data Frame | Contents |
|---|---|---|
| One Cluster | 0 to (30−M) | Set to 00h |
| | (31−M) to 30 | SRRI (M sectors) |
| | 31 | TDDS (1 sector) |

FIG. 6B  TDFL + TDDS

| Cluster | Data Frame | Contents |
|---|---|---|
| 0 | 0 to 31 | TDFL (N sectors) |
| ... | | |
| K | 0 to (x−1) | |
| | x to 31 | Set to 00h |
| | 31 | TDDS (1 sector) |

FIG. 6C  TDFL + SRRI + TDDS

| Cluster | Data Frame | Contents |
|---|---|---|
| 0 | 0 to 31 | TDFL (N sectors) |
| ... | | |
| K−1 | 0 to (x−1) | |
| | x to 31 | Set to 00h (<31 sectors) |
| K | 0 to (30−M) | |
| | (31−M) to 30 | SRRI (M sectors) |
| | 31 | TDDS (1 sector) |

$\begin{bmatrix} \text{K: NUMBER OF CLUSTERS} \\ \text{x: mod (N/32)−1} \end{bmatrix}$

FIG. 7

TDMS LAYOUT

| Cluster | Data Frame | Contents |
|---|---|---|
| 2 | 0 | TDFL 1 |
| | 1 to 30 | Set to 00h |
| | 0 to 31 | TDDS |
| P, P+1, ··· | 0 to 31 | TDFL m |
| P+(N−1) | 0 to (x−1) | |
| | x to 30 | Set to 00h |
| | 31 | TDDS |
| Z | 0 to 30 | SRRI n |
| | 31 | TDDS |
| 2047 | 0 to 31 | No data |

TDMS UPDATE UNIT #1 — covers cluster 2 rows
TDMS UPDATE UNIT #x — covers P..P+(N−1) rows
TDMS UPDATE UNIT #y — covers cluster Z rows

FIG. 8

| FIG. 8A |
|---|
| FIG. 8B |

FIG. 8A

TDDS (TEMPORARY DISK DEFINITION STRUCTURE)

| Data Frame | Byte position in Data Frame | Contents | number of bytes |
|---|---|---|---|
| 31 | 0 to 1 | TDDS identifier = "DS" | 2 |
| 31 | 2 | TDDS format = 00h | 1 |
| 31 | 3 | reserved and set to 00h | 1 |
| 31 | 4 to 7 | TDDS Update Count | 4 |
| 31 | 8 to 15 | reserved and set to 00h | 8 |
| 31 | 16 to 19 | first PSN of Drive Area (P_DA) | 4 |
| 31 | 20 to 23 | reserved and set to 00h | 4 |
| 31 | 24 to 27 | first PSN of Defect List (P_DFL) | 4 |
| 31 | 28 to 31 | reserved and set to 00h | 4 |
| 31 | 32 to 35 | Location of LSN 0 of User Data Area | 4 |
| 31 | 36 to 39 | last LSN of User Data Area | 4 |
| 31 | 40 to 43 | Inner Spare Area 0 size (ISA0_size) | 4 |
| 31 | 44 to 47 | Outer Spare Area size (OSA_size) | 4 |
| 31 | 48 to 51 | Inner Spare Area 1 size (ISA1_size) | 4 |
| 31 | 52 | Spare Area Full flags | 1 |
| 31 | 53 to 55 | reserved and set to 00h | 3 |
| 31 | 56 | Pre-write Area flags | 1 |
| 31 | 57 to 63 | reserved and set to 00h | 7 |
| 31 | 64 to 71 | Status bits of INFO1/PAC1 locations on L0 | 8 |
| 31 | 72 to 79 | Status bits of INFO2/PAC2 locations on L0 | 8 |
| 31 | 80 to 87 | Status bits of INFO1/PAC1 locations on L1 | 8 |
| 31 | 88 to 95 | Status bits of INFO2/PAC2 locations on L1 | 8 |
| 31 | 96 to 1023 | reserved and set to 00h | 928 |
| 31 | 1024 | Recording Mode | 1 |
| 31 | 1025 | general flag bits | 1 |
| 31 | 1026 to 1027 | Inconsistency flags | 2 |
| 31 | 1028 to 1031 | reserved and set to 00h | 4 |

FROM FIG. 8A

| 31 | 1032 to 1035 | Last Recorded Address of User Data Area | 4 |
|---|---|---|---|
| 31 | 1036 to 1039 | resevered and set to 00h | 4 |
| 31 | 1040 to 1043 | Size of TDMA in Inner Spare Area 0 | 4 |
| 31 | 1044 to 1047 | Size of TDMAs in Outer Spare Area(s) | 4 |
| 31 | 1048 to 1051 | Size of TDMA in Inner Spare Area 1 | 4 |
| 31 | 1052 to 1087 | reserved and set to 00h | 36 |
| 31 | 1088 to 1091 | next available PSN of Test Zone on L0 (P_TZ0) | 4 |
| 31 | 1092 to 1095 | next available PSN of Test Zone on L1 (P_TZ1) | 4 |
| 31 | 1096 to 1103 | reserved and set to 00h | 8 |
| 31 | 1104 to 1107 | next available PSN of Drive Calibration Zone on L0(P_CZ0) | 4 |
| 31 | 1108 to 1111 | next available PSN of Drive Calibration Zone on L1(P_CZ1) | 4 |
| 31 | 1112 to 1119 | reserved and set to 00h | 8 |
| 31 | 1120 to 1123 | first PSN of 1st Cluster of Defect List (P_1stDFL) | 4 |
| 31 | 1124 to 1127 | first PSN of 2nd Cluster of Defect List (P_2ndDFL) | 4 |
| 31 | 1128 to 1131 | first PSN of 3rd Cluster of Defect List (P_3rdDFL) | 4 |
| 31 | 1132 to 1135 | first PSN of 4th Cluster of Defect List (P_4thDFL) | 4 |
| 31 | 1136 to 1139 | first PSN of 5th Cluster of Defect List (P_5thDFL) | 4 |
| 31 | 1140 to 1143 | first PSN of 6th Cluster of Defect List (P_6thDFL) | 4 |
| 31 | 1144 to 1147 | first PSN of 7th Cluster of Defect List (P_7thDFL) | 4 |
| 31 | 1148 to 1151 | first PSN of 8th Cluster of Defect List (P_8thDFL) | 4 |
| 31 | 1152 to 1183 | reserved and set to 00h | 32 |
| 31 | 1184 to 1187 | first PSN of SRRI/SBM for L0 (P_SRRI/P_SBM0) | 4 |
| 31 | 1188 to 1191 | first PSN of SBM for L1 (P_SBM1) | 4 |
| 31 | 1192 to 1215 | reserved and set to 00h | 24 |
| 31 | 1216 to 1219 | next available PSN of ISA0 (P_ISA0) | 4 |
| 31 | 1220 to 1223 | next available PSN of OSA0 (P_OSA0) | 4 |
| 31 | 1224 to 1227 | next available PSN of OSA1 (P_OSA1) | 4 |
| 31 | 1228 to 1231 | next available PSN of ISA1 (P_ISA1) | 4 |
| 31 | 1232 to 1915 | reserved and set to 00h | 684 |
| 31 | 1916 to 1919 | Year/Month/Date of recording | 4 |
| 31 | 1920 to 2047 | drive ID : Manufacturers Name<br>Additional ID<br>Unique Serial Number | 48<br>48<br>32 |

FIG. 9
TDFL

| Cluster Number/ Data Frame Number | Byte position in Data Frame | Contents | number of bytes |
|---|---|---|---|
| 0 / 0 | 0 | Temporary Defect List Header | 64 |
| 0 / 0 | 64 | Temporary List of Defects (LOW Entry / DFL Entry) | N × 8 |
| ... | | ... | |
| m / n | k | Temporary Defect List Terminator | 8 |
| m / 31 | k + 8 | Reserved (00h) | ... |

N: NUMBER OF ENTRIES m: ip ((64+N × 8)/65536)

n: ip (mod((64+N × 8)/65536)/2048)

k: mod (mod((64+N × 8)/65536)/2048)

FIG. 10A

DFL ENTRY

DFL ENTRY i (8 BYTES)

| byte 0 / bit 7...4 of DFL Entry i | byte 0 / bit 3..0 & byte 1 to 3 of DFL Entry i | byte 4 / bit 7...4 of DFL Entry i | byte 4 / bit 3..0 & byte 5 to 7 of DFL Entry i |
|---|---|---|---|
| $b_{63}$ .... $b_{60}$ | $b_{59}$ .... $b_{32}$ | $b_{31}$ .... $b_{28}$ | $b_{27}$ .... $b_0$ |
| Status 1 | Original Cluster First PSN | Status 2 | Replacement Cluster First PSN |

FIG. 10B

| Status 1 | Status 2 | Definition |
|---|---|---|
| 0000 | 0000 | Normal Replacement Information |
| 0001 | 0000 | Defect Cluster with no Replacement |
| 0000 | 0001 | Start Address of Burst Block Replacement |
| 0000 | 0010 | End Address of Burst Block Replacement |

SRR (SEQUENTIAL RECORDING RANGE)
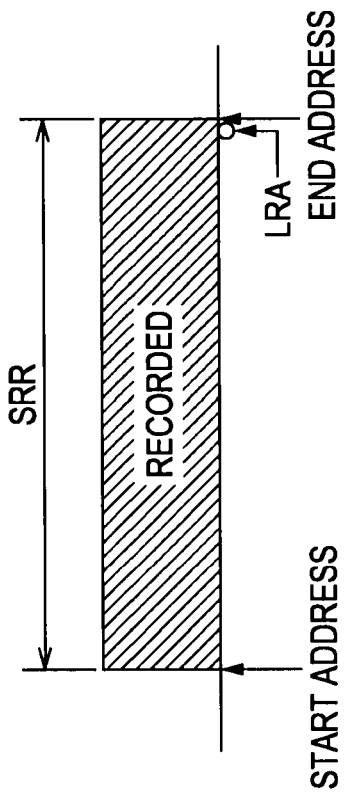
FIG. 11A OPEN SRR
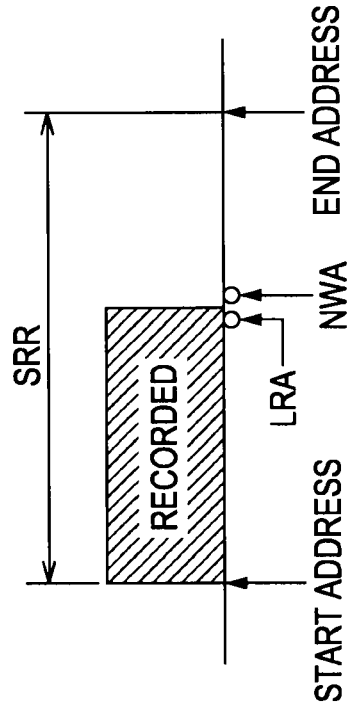
FIG. 11B CLOSED SRR
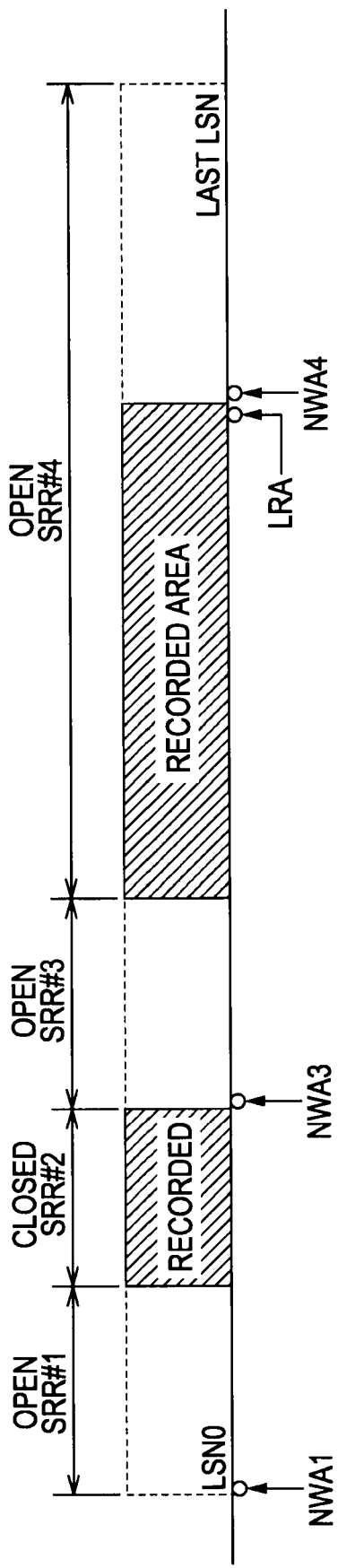
FIG. 11C SRRs IN SEQUENTIAL RECORDING MODE

FIG. 12

SRRI (SEQUENTIAL RECORDING RANGE INFORMATION)

| Relative Data Frame Number | Byte position in Data Frame | Contents | Number of bytes |
|---|---|---|---|
| 31 − M | 0 | SRRI Header | 64 |
| 31 − M | 64 | List of SRR entries | N_SRR × 8 |
| : | : | : | |
| : | 64 + (N_SRR × 8) | SRRI Terminator | 8 |
| 30 | 64 + (N_SRR+1) × 8 | Reserved (00h) | : |
| (31) | | (TDDS) | |

M : NUMBER OF SECTORS CONSTITUTING SRRI
N_SRR : NUMBER OF SRR ENTRIES

FIG. 13A

SRRI HEADER

| Relative Data Frame Number | Byte position in Data Frame | Contents | Number of bytes |
|---|---|---|---|
| 31 − M | 0 | SRRI Identifier = "SR" | 2 |
| 31 − M | 2 | SRRI format = 00h | 1 |
| 31 − M | 3 | Reserved (00h) | 1 |
| 31 − M | 4 | SRRI Update Count | 4 |
| 31 − M | 8 | Reserved (00h) | 4 |
| 31 − M | 12 | Number of SRR Entries | 4 |
| 31 − M | 16 | Number of Open SRRs | 1 |
| 31 − M | 17 | Reserved (00h) | 3 |
| 31 − M | 20 | List of Open SRR numbers | 16 × 2 |
| 31 − M | 52 | Reserved (00h) | 12 |

M: NUMBER OF SECTORS CONSTITUTING SRRI

FIG. 13B

LIST OF OPEN SRR NUMBERS

| | | | |
|---|---|---|---|
| 31 − M | 20 | 1st Open SRR Number | 2 |
| 31 − M | 22 | 2nd Open SRR Number | 2 |
| 31 − M | : | : | : |
| 31 − M | 50 | 16th Open SRR Number | 2 |

SRR ENTRY

FIG. 16

TDMA ACCESS INDICATOR

| Sector 0 | Copy of latest TDDS at that time |
|---|---|
| Sector 1 | Copy of latest TDDS at that time |
| ⋮ | ⋮ |
| Sector 30 | Copy of latest TDDS at that time |
| Sector 31 | Copy of latest TDDS at that time |

TDFL DATA ACQUISITION METHOD OF RELATED ART

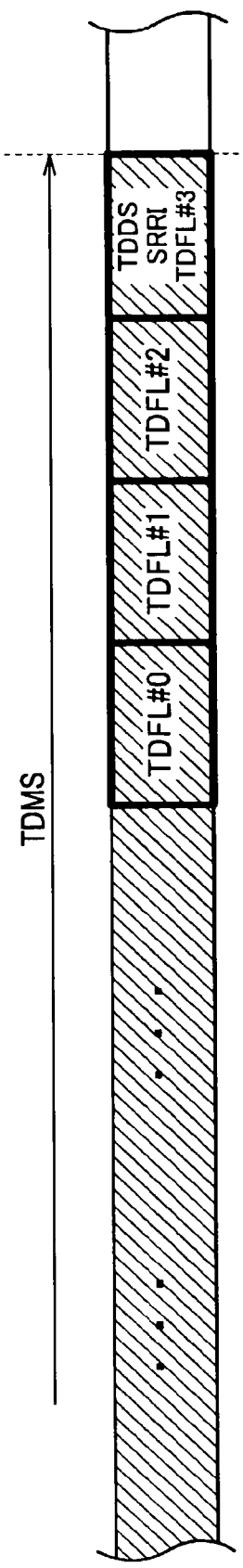
FIG. 20A CASE OF SL
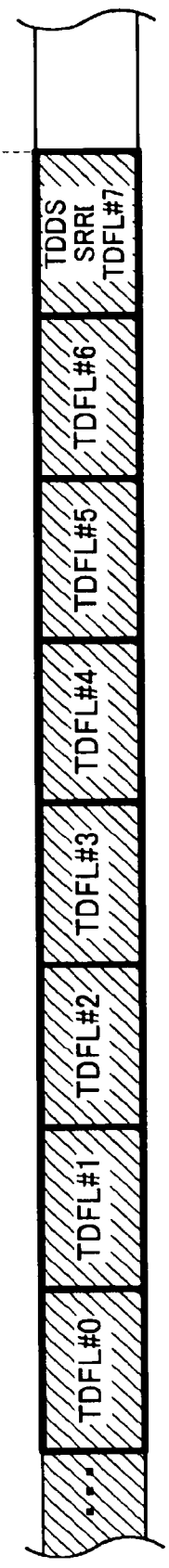
FIG. 20B CASE OF DL

US 7,969,842 B2

PLAYBACK DEVICE AND MANAGEMENT INFORMATION ACQUIRING METHOD

CROSS REFERENCES TO RELATED APPLICATIONS

The present invention contains subject matter related to Japanese Patent Application JP 2007-126255 filed in the Japanese Patent Office on May 11, 2007, the entire contents of which are incorporated herein by reference.

BACKGROUND OF THE INVENTION

1. Field of the Invention

The present invention relates to a playback device that performs at least playback from a recording medium such as an optical disc, and a management information acquiring method for acquiring the latest management information from the recording medium.

2. Description of the Related Art

Data recording/playback techniques exist which use optical discs (including magneto-optical discs) as recording media, such as a CD (Compact Disc), an MD (Mini-Disc), and a DVD (Digital Versatile Disc), for recording/playing back digital data. The term optical discs generically refers to recording media formed of a thin disc-like metal plate protected with plastic, onto which laser light is radiated and a signal is read by detecting variations in the reflected light.

Optical discs include, for example, read-only optical discs such as a CD, a CD-ROM, and a DVD-ROM, and recordable optical discs, such as an MD, a CD-R, a CD-RW, a DVD-R, a DVD-RW, a DVD+RW, and a DVD-RAM in which user data can be recorded. Data can be recorded on such recordable optical discs by employing recording techniques such as magneto-optical recording, phase-change recording, and dye-film change recording. Dye-film change recording is also called write-once recording and is suitable for data storage applications, since it permits recording of data only once and does not permit rewriting. On the other hand, magneto-optical recording and phase-change recording permit rewriting of data, and area thus used for various applications, including recording of various kinds of content data such as music, video, games, and application programs.

In recent years, a high-density optical disc called Blu-ray Disc (registered trademark) has been developed with a view to realizing a significant increase in capacity.

In such a high-density optical disc, for example, when data recording/playback is performed using a combination of a laser with a wavelength of 405 nm (i.e., so-called blue laser) and an objective lens with an NA of 0.85, approximately 23.3 GB (gigabytes) of data can be recorded on or played back from a disc having a diameter of 12 cm. In this example, this capacity is achieved when the disc has a track pitch of 0.32 μm, a linear density of 0.12 μm/bit, and a format efficiency of approximately 82% with a recording/playback unit of a 64 KB (kilobytes) data block.

Write-once types and rewritable types of such high-density optical discs have also been developed.

As a type of Blu-ray disc, for example, BD-R (Blu-ray Disc Recordable) which can be written to only once has a TDMS (Temporary Disc Management Structure) as management information for managing the data recording structure or disc defect information, and it is specified that the TDMS be additionally recorded to a TDMA (Temporary Disc Management Area) that is a management information recording area provided at a predetermined position on the disc. The last additionally recorded TDMS is the latest (that is, a valid) TDMS (see FIGS. 5A to 5D).

A plurality of TDMAs are provided in the lead-in area or data area at the inner radius of the disc, and a serial number such as TDMAn (n=0, 1, 2, and so on) is assigned to each individual TDMA. It is specified that the TDMAs be used in the order of their numbers, as in the order of TDMA0, TDMA1, TDMA2, and so on, and that the TDMSs be recorded to each TDMA successively in order from the beginning of the TDMA.

In this regard, each TDMS to be additionally recorded sequentially into the TDMA as mentioned above stores an SRRI (Sequential Recording Range Information: management information about the recording structure of data in the user data area) and, as required, a TDFL (Temporary Defect List: management information about defects on the disc) (for example, see FIG. 6C). Further, in this TDMS, a TDDS (Temporary Disc Definition Structure) as pointer information for indicating the recording position of the latest information (that is, the last recorded information) of the TDFL, SRRI is stored in its last sector.

Due to the above-mentioned structure of the TDMS, to acquire the latest management information (SRRI or TDFL) recorded on the disc on the drive device side, first, with respect to the latest TDMS recorded last in the TDMA, the above-mentioned TDDS in its last sector is read. Then, data is read from a position pointed to by the pointer information in the read TDDS, so the latest management information can be acquired.

The related art techniques are disclosed in Japanese Unexamined Patent Application Publication No. 2006-85859 and Japanese Unexamined Patent Application Publication No. 2006-114107.

SUMMARY OF THE INVENTION

As mentioned above, according to the related art, to acquire the latest TDFL, SRRI from TDDS information, the TDDS is read first, and then data is read on the basis of the pointer information stored in that TDDS.

However, according to the related art technique mentioned above, after performing a seek operation for reading the TDDS, a seek operation for reading data on the basis of the pointer information in this TDDS is required. In this respect, a considerable amount of time is required until the latest management information is acquired.

It is desirable to make the operation of acquiring the latest management information faster.

According to an embodiment of the present invention, there is provided a playback device which performs at least playback from a recording medium including a user data recording area where user data can be recorded, and a temporary management information unit recording area where a temporary management information recording unit is sequentially recorded in response to updating of temporary management information that is to be updated in response to recording of data to the user data recording area, the temporary management information recording unit being capable of storing the temporary management information and storing at its end position pointer information pointing to a recording position of the temporary management information. The playback device includes: reading means for performing reading from the recording medium; and control means for acquiring the latest version of the temporary management information recorded last on the recording medium, the control means executing a read control process of controlling the reading means so that when reading the pointer information in the temporary management information unit recorded last in the temporary management information unit recording area, reading of data is executed from a predetermined position located before a segment in which the pointer information is included, and an information acquiring process of executing a process for acquiring the temporary management information pointed to by the pointer information from the data read in response to the read control process.

The above-mentioned embodiment of the present invention also assumes a recording medium including, like BD-R mentioned above, a user data recording area where user data can be recorded, and a temporary management information unit recording area (TDMA) where a temporary management information recording unit (TDMS) is sequentially recorded in response to updating of temporary management information that is to be updated in response to recording of data to the user data recording area, the temporary management information recording unit being capable of storing the temporary management information and storing at its end position pointer information (TDDS) pointing to a recording position of the temporary management information.

Further, according to an embodiment of the present invention, the following operation is performed to acquire the latest temporary management information recorded last on the recording medium. That is, when reading the pointer information (TDDS) in the temporary management information unit (TDMS) recorded last in the temporary management information unit recording area (TDMA), reading of data is executed from a predetermined position located before a segment in which the pointer information is included. Then, a process for acquiring the temporary management information pointed to by the pointer information from the data read in this way is performed.

Since the pointer information is stored at the end position in the temporary management formation unit, by reading data from a predetermined position located before a segment where the temporary management information is included, the segment where the temporary management information is included can be read in advance. This allows the number of read operations required for acquiring the pointer information and the temporary management information to be reduced down to one at minimum.

As mentioned above, according to the present invention, the number of read operations required for the acquisition of pointer information for acquiring the latest management information, and for the acquisition of the latest management information pointed by the pointer information can be reduced down to one at minimum, thereby making the operation of acquiring the latest management information faster than in the related art.

BRIEF DESCRIPTION OF THE DRAWINGS

FIG. 3 is an explanatory diagram of a DMA of a disc according to an embodiment of the present invention;

FIG. 4 is an explanatory diagram of a DDS of a disc according to an embodiment of the present invention;

FIGS. 5A to 5D are explanatory diagrams of the structure of a TDMA0 of a disc according to an embodiment of the present invention;

FIGS. 6A to 6C are explanatory diagrams of TDMS update units according to an embodiment of the present invention;

FIG. 7 is an explanatory diagram of how TDMS update units are additionally recorded according to an embodiment of the present invention;

FIGS. 8A and 8B are explanatory diagrams of a TDDS of a disc according to an embodiment of the present invention;

FIG. 9 is an explanatory diagram of a TDFL of a disc according to an embodiment of the present invention;

FIGS. 10A and 10B are explanatory diagrams of a DFL entry of a disc according to an embodiment of the present invention;

FIGS. 11A to 11C are explanatory diagrams of SRRs of a disc according to an embodiment of the present invention;

FIG. 12 is an explanatory diagram of an SRRI of a disc according to an embodiment of the present invention;

FIGS. 13A and 13B are explanatory diagrams of an SRRI Header of a disc according to an embodiment of the present invention;

FIG. 16 is a diagram showing the structure of data in an TDMA access indicator;

FIGS. 20A and 20B are diagrams showing the structure of a TDMS in a case where the maximum possible number of TDFLs are stored.

DESCRIPTION OF THE PREFERRED EMBODIMENTS

Hereinbelow, an embodiment of the present invention will be described in the following order of topics.
1. Disc Structure
2. DMA
3. TDMA
3-1 TDMA Structure and TDMS Update Unit
3-2 TDDS
3-3 TDFL
3-4 SRR and SRRI
3-5 Replacement Process using Spare Area
3-6 Additional Recording Process to Next TDMA
4. Configuration of Disc Drive Device
5. Management Information Acquiring Process according to Related Art
6. Management Information Acquiring Process according to This Embodiment 1. Disc Structure First, an optical disc used in a recording system according to an embodiment of the present invention will be described. This optical disc may be implemented as a write-once disc within the category of a high-density optical disc system called a Blu-ray disc.

Typical physical parameters of the high-density optical disc system employed in this embodiment will be described. As for its disc size, the optical disc according to this embodiment is 120 mm in diameter and 1.2 mm in thickness.

That is, in these respects, the optical disc according to this embodiment is similar to the CD (Compact Disc) type disc or the DVD (Digital Versatile Disc) type disc in terms of its outer shape.

As the laser for effecting recording/playback, so-called blue laser is used. A user data capacity of 23 G to 25 G bytes is realized with a disc having a diameter of 12 cm by employing a high NA (for example, NA=0.85) for the optical system, and by realizing a narrow track pitch (for example, a track pitch=0.32 μm) and a high linear density (for example, a recording linear density of 0.12 μm).

Also, there has been developed a so-called dual layer disc which has two recording layers. With the dual layer disc, the user data capacity is on the order of 50 G bytes.

Figure 1:
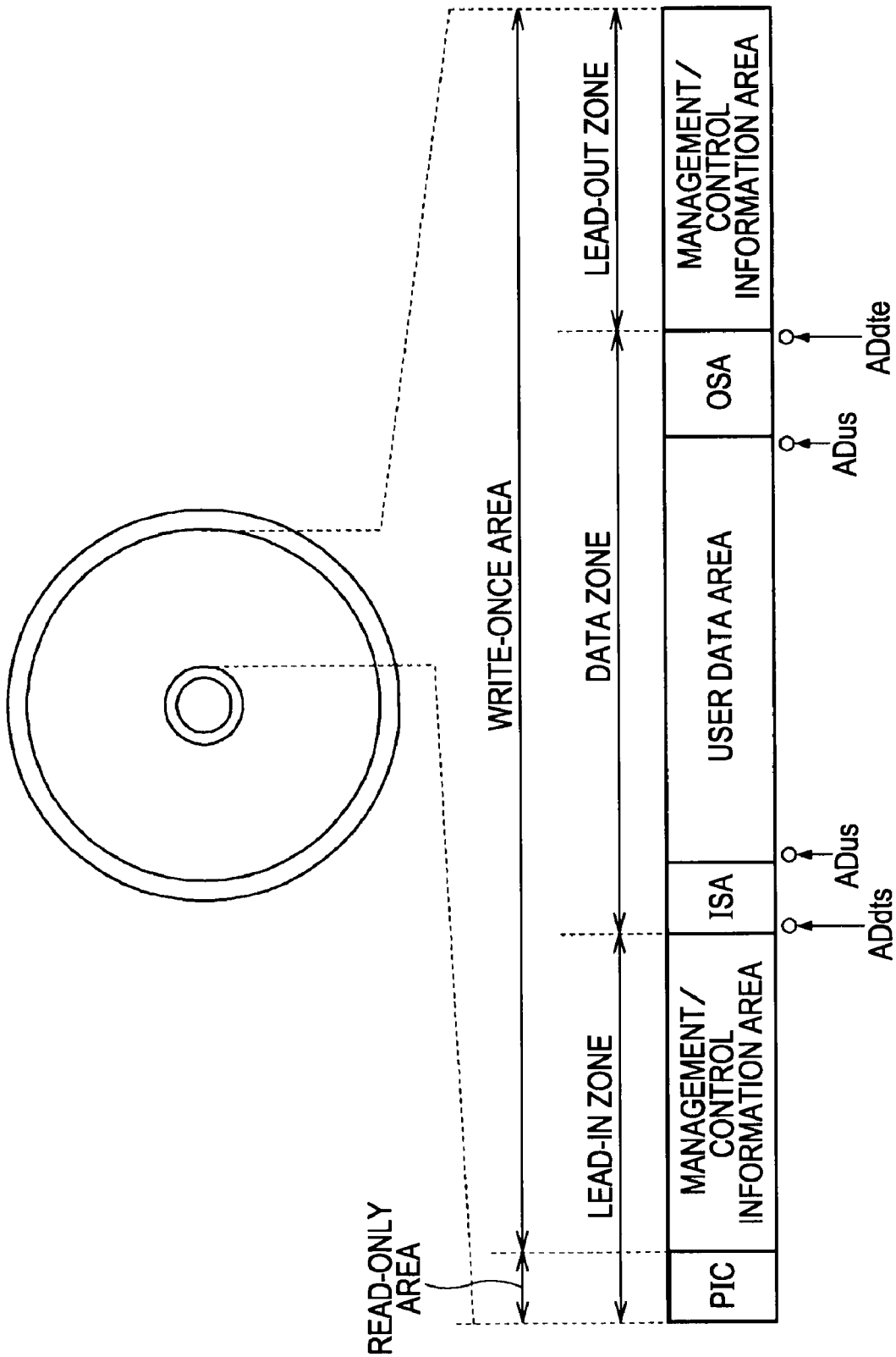
FIG. 1 is an explanatory diagram of the area structure of a disc according to an embodiment of the present invention.

FIG. 1 shows the overall layout (area configuration) of the disc.

In the system according to this embodiment, the layout shown in FIG. 1 is formed by the formatting (initialization) process of the disc. Also, the following description will be directed to a case where the optical disc is a single layer (SL) disc.

On the disc, the following areas are arranged from the inner radius side: a lead-in zone, a data zone, and a lead-out zone.

As for the configuration of areas related to recording/playback, a pre-recorded information area PIC on the innermost radius side of the lead-in zone is a read-only area, while the area from the management area of the lead-in zone up to the lead-out zone is a write-once area which can be written to only once.

In the read-only area and the write-once area, a spiral recording track is formed by a wobbled groove (meandering groove). The groove serves as a guide for tracking at the time of tracing using a laser spot, and recording/playback of data is performed with this groove as a recording track.

While this embodiment assumes an optical disc in which data is recorded in the groove, the present invention is not limited to such a groove-recording optical disc but may be applied to a land-recording optical disc in which data is recorded in the land between adjacent grooves, or to a land-groove recording optical disc in which data is recorded in both the groove and land.

The groove serving as the recording track meanders in accordance with a wobble signal. Thus, the disc drive device for the optical disc radiates a laser spot onto the groove to detect the positions of the opposite edges of the groove from reflected light of the laser spot. Then, the disc drive device extracts variation components of the edge positions with respect to the disc radius direction by moving the laser spot along the recording track, thereby playing back the wobble signal.

In this wobble signal, the address information (physical address and other such additional information) of a recording track at the recording position is modulated. Hence, in the disc drive device, address control or the like can be performed at the time of data recording or playback by demodulating the address information or the like from this wobble signal.

The lead-in zone shown in FIG. 1 is an area located inside a radius of 24 mm, for example.

The area located inside a radius of 22.2 mm to 23.1 mm within the lead-in zone is the pre-recorded area PIC.

In the pre-recorded area PIC, disc information such as the recording/playback power conditions, disc area information, information used for copy protection, and the like are recorded in advance as read-only information by wobbling of the groove. The above information may also be recorded with embossed pits or the like.

Although not shown, there may be cases where a BCA (Burst Cutting Area) is provided on the further inner radius side than the pre-recorded information area PIC. In the BCA, a unique ID that is unique to a disc recording medium is recorded by a recording method of burning out the recording layer. That is, recording marks are formed so as to be arranged concentrically side by side, thereby producing barcode-type recorded data.

The area within with a radius of, for example, 23.1 mm to 24 mm in the lead-in zone is a management/control information area.

In the management/control information area, a predetermined area format having a control data area, a DMA (Disc Management Area), TDMA0 (TDMA: Temporary Disc Management Area), a test write area (OPC), a buffer area, and the like is set.

That is, the following pieces of information are recorded in the control data area in the management/control information area: the disc type, disc size, disc version, layer structure, channel bit length, BCA information, transfer rate, data zone position information, recording linear velocity, recording/playback laser power information, and so on.

The test write area (OPC), similarly provided within the management/control information area, is used for test write operations when setting data recording/playback conditions, such as the laser power at the time of recording/playback. That is, the test write area is an area used for adjusting the recording/playback conditions.

The DMA is provided within the management/control information area. In the field of disc systems, the DMA is generally referred to as "Defect Management Area" in which replacement management information for detect management is recorded. However, in the disc according to this embodiment, the DMS records not only replacement management information for a defect location but also management/control information for realizing rewriting of data on this write-once disc. Further, SRRI described later is also recorded in the DMA. The DMA thus functions as a "Disc Management Area".

To enable data rewriting through a replacement process, the contents of the replacement management information must be updated in response to data rewriting. Further, management information related to the data recording structure or the like must be also updated in response to every time data is additionally recorded. For this reason, there is provided an area called TDMA for updating of these pieces of management information.

In this case, the management information related to replacement and the data recording structure as mentioned above (hereinafter, also simply referred to as "management information") is additionally recorded and updated sequentially from the TDMA0. Although described in more detail later, if the TDMA0 has been used up for the updating of management information, data can be additionally recorded to TDMA1, TDMA2 serving as other writing areas for management information (see FIG. 2). The last management information recorded to the TDMA (latest management information) at the time of disc finalization is recorded to the DMA.

A more detail description will be given of the DMA and the TDMA later.

The data zone is located within a radius of, for example, 24.0 mm to 58.0 mm on the outer radius side than the lead-in zone. The data zone is an area to/from which user data is actually recorded/played back. The data zone has a start address ADdts and an end address ADdte, which are indicated by data zone position information in the above-mentioned control data area.

In the disc according to this embodiment, a spare area is defined in the data zone. In this case, in the data zone, an ISA (Inner Spare Area) and an OSA (Outer Spare Area) are provided on the innermost radius side and on the outermost radius side, respectively. The ISA and the OSA each serve as a spare area used for a replacement process due to a defect.

The ISA is formed by a preset number of clusters from the start position of the data zone (1 cluster=65536 bytes).

The OSA is formed by a preset number of clusters from the end position of the data zone towards the inner radius side. The sizes of the ISA and the OSA are described in the above-mentioned DMA.

In the data zone, the user data area is provided between the ISA and the OSA. This user data area is a normal recording/playback area normally used for recording/playback of user data.

The position of the user data area, that is, its start address ADus and end address Adue, is described in the above-mentioned DMA.

With respect to a write-once medium which does not normally allow rewriting, this embodiment realizes data rewriting using a replacement process. That is, when attempting to write over the data already recorded on an existing block (an area such as a cluster), new data is recorded on another block, and this is managed as replacement management information as in the case of defect replacement, thereby realizing an overwrite logically. For replacement in the case of such rewriting, basically, a block within the user data area is used as the replacement destination.

In FIG. 1, the area located on the outer radius side than the data zone, for example, within a radius of 58.0 mm to 58.5 mm is defined as the lead-out zone. This lead-out zone is a management/control information area where a control data area, the DMA, a buffer area, and the like are defined in a predetermined format. In the control data area, as in the control data area in the lead-in zone, various kinds of management/control information are recorded. Like the DMA in the lead-in zone, the DMA is prepared as an area for recording management information for the ISA and the OSA.

Figure 2:
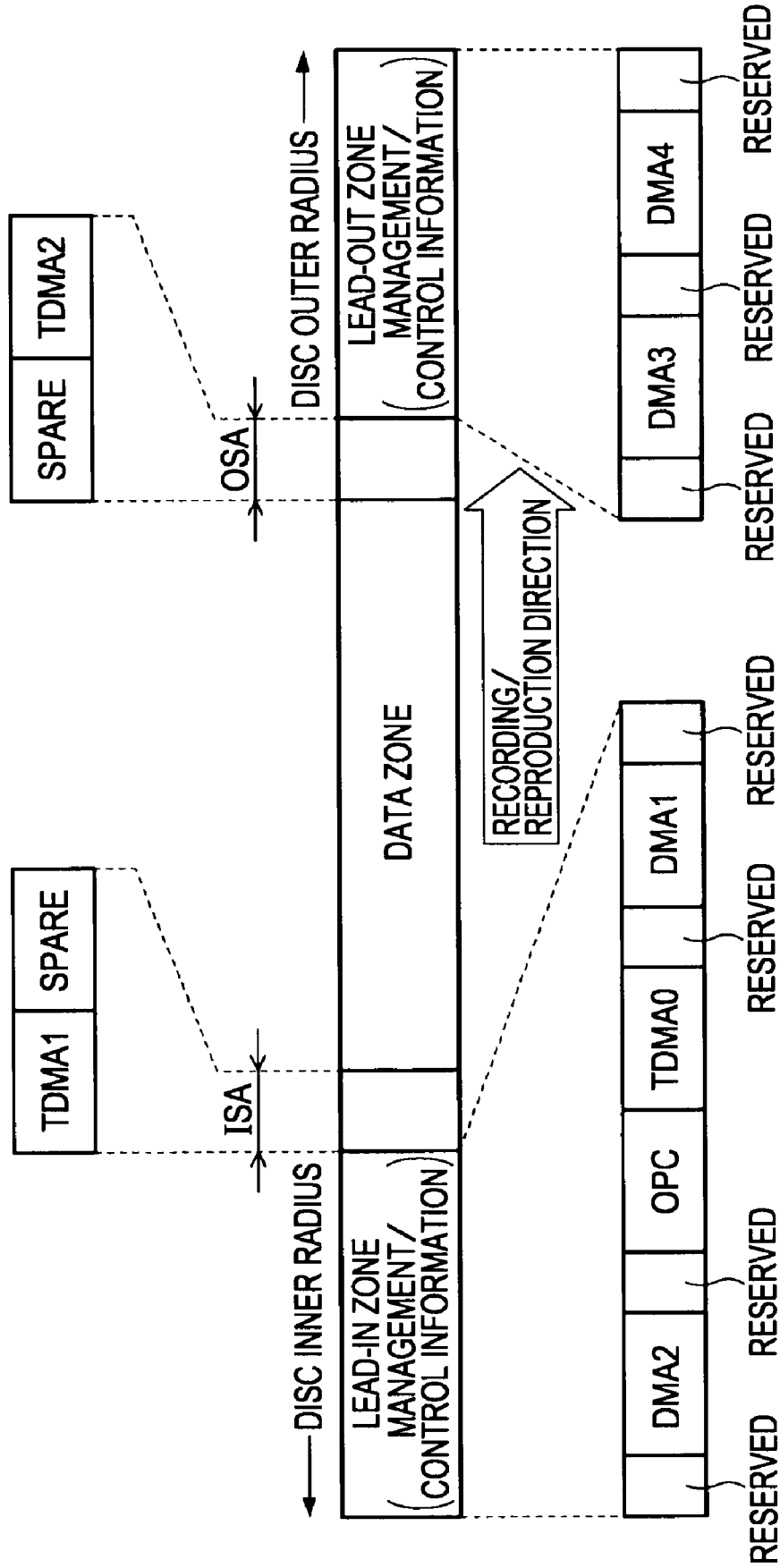
FIG. 2 is an explanatory diagram showing an example of the structure of a management/control information area of a disc, and TDMAs that can be set in spare areas according to an embodiment of the present invention.

FIG. 2 shows an example of the structure of the management/control information area, and TDMA1, TDMA2 that can be set within the spare area.

In the lead-in zone, the areas of DMA2, OPC (test write area), the TDMA0, and DMA1 are defined, except for an undefined segment (reserved). In the lead-out zone, the areas of DMA3 and DMA4 are defined, except for an undefined segment (reserved).

The above-described control data area is not shown. The control data area is omitted from the drawing because in actuality a portion of the control data area becomes the DMA.

TDMA1 and TDMA2 can be provided within the spare area as shown in the drawing. Specifically, TDMA1 can be set within the ISA, and TDMA2 can be set within the OSA. These TDMA1 and TDMA2 can be set as additional management information recording areas when the TDMA0 provided in the lead-in zone has been used up for the updating of management information. That is, in a case where two TDMAs, TDMA1 and TDMA2, are provided as shown in the drawing, updating of management information is performed in the order of the TDMA0, TDMA1, and TDMA2. In this case, only the start address of TDMA1 is fixed, and its end address is variable. As for TDMA2, only its start address is fixed, and its end address is variable. That is, there can be a case where the size of TDMA1, TDMA2 is 0.

When the disc is finalized, the last updated management information in the TDMA is written to the DMA. As described above, two DMAs are provided in each of the lead-in zone and the lead-out zone, that is, a total of four DMAs are provided. The same management information is recorded in these DMA1 to DMA4. That is, the same management information updated last in the TDMA is recorded to these DMAs. By writing a large volume of the same management information, reading of management information can be performed with greater reliability after finalization.

To summarize the above description, the DMA is not used until the disc is finalized, and replacement management is carried out in the TDMA. Once the disc is finalized, the latest management information recorded in the TDMA at that point is recorded to the DMA. Thereafter, replacement management based on the DMA becomes possible.

2. DMA

The structure of the DMA recorded in the lead-in zone and in the lead-out zone is shown in FIG. 3.

In this example, the size of each DMA is 2 clusters. It is to be understood, however, that the DMA size is not limited to 2 clusters.

The size of 1 cluster is 65536 bytes, and this represents the smallest data recording unit. A unit called a sector (or data frame) has a size of 2048 bytes. Hence, 1 cluster is made up of 32 sectors (or 32 data frames). While a sector and a data frame are the same in terms of the user data size, a sector refers to a physical data unit, whereas a data frame refers to a logical data unit.

Addresses are allocated in units of sectors. Herein, a physical sector address is referred to as PSN (Physical Sector Number), and a logical sector address is referred to as LSN (Logical Sector Number).

FIG. 3 shows, with cluster numbers 1 to 32 assigned to individual ones of 2 clusters, the positions of individual data contents in the DMA. The size of each individual data content is represented by the number of clusters.

In the DMA, the segment of 4 clusters with cluster numbers 1 to 4 records detailed information on the disc as the DDS (Disc Definition Structure).

While the contents of the DDS will be described later with reference to FIG. 4, the DDS has a size of 1 cluster, and is repeatedly recorded four times in this four-cluster segment.

The four-cluster segment from the cluster numbers 5 to 8 serves as the first recording area for the Defect List DFL (DFL#1). The Defect List DFL is data of a four-cluster size in which each individual replacement address information (DFL, LOW entry described later) is listed.

The four-cluster segment from the cluster numbers 9 to 12 serves as the second recording area for the Defect List DFL (DFL#2).

Likewise, for the subsequent four-cluster segments, the recording areas for the third Defect List DFL#3 to the sixth Defect List DFL#6 are respectively provided. The four-cluster segment from the cluster numbers 29 to 32 serves as the seventh recording area for the Defect List DFL (DFL#7).

Thus, seven recording areas for the Defect List DFLs#1 to #7 are prepared in the 32-cluster DMA.

In the case of a write-once optical disc which can be written to only once as in this embodiment, to record the contents of the DMA, it is necessary to perform a process called finalization. In that case, the contents of the seven Defect Lists DFL#1 to DFL#7 to be written into the DMA are the same so as to ensure compatibility.

A description of the structure of the Defect List DFL is omitted because it is almost the same as that of a TDFL (Temporary DFL) in the TDMA that will be described later.

FIG. 4 shows the contents of the DDS to be recorded at the beginning of the DMA shown in FIG. 3 mentioned above.

As mentioned above, the DDS has a size of 1 cluster (65536 bytes).

In FIG. 4, the byte positions are indicated with the first byte of the 65536-byte DDS taken as byte 0. The number of bytes indicates the number of bytes corresponding to each data content.

2 bytes at the byte positions 0 and 1, DDS Identifier="DS" for identifying the corresponding cluster as a DDS cluster is recorded.

1 byte at the byte position 2 records the DDS format number (format version).

4 bytes at the byte positions 4 to 7 records the number of updates performed on the DDS (DDS Update Count). It should be noted that in this embodiment, the DMA itself is not updated but management information is written into the DMA at finalization. Updating of management information is performed in the TDMA. Accordingly, at finalization, the number of updates performed on the DDS (TDDS: Temporary DDS) is recorded in the bytes at these byte positions.

4 bytes at the byte positions 16 to 19 records the first physical sector address of the drive area in the DMA.

4 bytes at the byte positions 24 to 27 records the first physical sector address of the Defect List DFL in the DMA.

4 bytes at the byte positions 32 to 35 indicate the PSN (Physical Sector Number: physical sector address) indicating the first position (ADus in FIG. 1) of the user data area in the data zone, that is, the position of the LSN (Logical Sector Number: logical sector address) of "0".

4 bytes at the byte positions 36 to 39 indicate the LSN (Logical Sector Number) of the end position (ADue in FIG. 1) of the user data area in the data zone.

4 bytes at the byte positions 40 to 43 records the size of the ISA in the data zone.

4 bytes at the byte positions 44 to 47 records the size of the OSA per layer in the data zone.

4 bytes at the byte positions 48 to 51 indicate the size of the ISA (the ISA of the second layer in a dual layer disc) in the data zone.

1 byte at the byte position 52 indicates a Spare Area Full Flag indicating whether or not data writing can be performed using the ISA, OSA. The Spare Area Full Flag is set when all of the ISA or OSA has been used up.

1 byte at the byte position 54 indicates a Disc Certification Flag which represents the status of disc authentication.

4 bytes at the byte positions 56 to 59 indicate the last verified address as a Last Verified Address Pointer.

The other byte positions are reserved (undefined), and are all set to 00h.

In the DMA, various pieces of management information are recorded according to the data structure described above. However, as described above, it is when the disc is finalized that these pieces are recorded to the DMA, and at that time, the latest management information in the TDMA will be reflected on the DMA.

A replacement process for defect management or data rewriting, and the accompanying updating of management information are performed in the TDMA described next.

3. TDMA 3-1 TDMA Structure and TDMS Update Unit

Next, the TDMA will be described. While the TDMA (Temporary DMA) is an area in which management information is recorded as in the DMA, the TDMA is updated as management information is additionally recorded in response to the occurrence of data rewriting or a replacement process based on defect detection.

FIGS. 5A to 5D show the structure of the TDMA0. As shown in FIGS. 5A and 5B, the size of the TDMA provided within the management/control information area is, for example, 2048 clusters.

FIG. 5C shows the structure of the TDMA0 using 2048 clusters.

First, the first 3 clusters CL0, CL1, and CL2 of the TDMA0 each function as an access indicator (access indicator area).

The cluster CL2 is set as a TDMA1 access indicator, and the cluster CL1 is set as a TDMA2 access indicator. In each of these TDMA access indicators, a structure including the latest TDDS (Temporary Disc Definition Structure: described later) is recorded when information is recorded to the corresponding TDMA for the first time. Specifically, when information is recorded to the TDMA1 for the first time, the latest TDDS within the TDMA1 is recorded into the TDMA1 access indicator of the cluster CL2. Likewise, when information is recorded to the TDMA2 for the first time, the latest TDDS within the TDMA2 is recorded into the TDMA2 access indicator of the cluster CL1.

In this case, as long as information is updated within the TDMA0, writing of information to each TDMA access indicator is not performed at all. This means that if information has not been written to neither the TDMA1 access indicator nor the TDMA2 access indicator, it is found that the latest management information resides within the TDMA0 (except when the disc is a blank disc). According to the above description, if information has been written to the TDMA1 access indicator, it is found that the latest management information resides within the TDMA1, and if information has been written to the TDMA2 access indicator, it is found that the latest management information resides within the TDMA2.

The cluster CL0 is set as a DMA access indicator. When the DMA is recorded following finalization, necessary pieces of information are acquired from the latest TDMS (Temporary Disc Management Structure: described later) and recorded into the DMA access indicator.

As mentioned above, if data has not been written to neither the cluster CL1 nor the cluster CL2, the latest TDMA can be acquired from the TDMA0. If information has been recorded to the cluster CL1, the latest TDMA can be acquired from the TDMA1, and if information has been recorded to the cluster CL1, the latest TDMA can be acquired from the TDMA2.

If information has been recorded in the DMA access indicator as the cluster CL0, this indicates that the disc in question has been finalized so that writing is prohibited, and that the latest disc information can be acquired from the DMA.

The DMA access indicator also serves as information indicating whether or not a disc has been finalized on the basis of whether or not information has been written in the DMA access indicator.

The clusters CL3 to CL2047 of the TDMA0 are used as a TDMS write area for updating of management information.

The structure constituting the management information recorded from the cluster CL3 onwards is referred to as TDMS (Temporary Disc Management Structure).

The TDMSs are additionally recorded in TDMS update units each having a variable size of 1 to N clusters.

In the Sequential Recording Mode, N mentioned above is set to "4". In the case of a dual layer disc, N mentioned above is set to "8".

For example, FIG. 5D shows a state in which a one-cluster TDMS update unit is recorded in the first cluster, the cluster CL3, then a one-cluster TDMS update unit is recorded in the cluster CL4, and further a two-cluster TDMS update unit is recorded in the cluster CL5.

In this way, the TDMSs are sequentially recorded to contiguous clusters in TDMS update units as the necessity for updating management information arises. When recording TDMS update units, the latest TDMS update unit is recorded immediately after the last recorded cluster at that time without a gap.

In a case where the Sequential Recording Mode is employed as the recording mode for the write-once disc according to this embodiment, the following three elements constitute the TDMS: TDDS (Temporary Disc Definition Structure), TDFL (Temporary Defect List), and SRRI (Sequential Recording Range Information). These elements are always recorded in the same TDMA.

Although will be described in detail later, the TDDS mainly includes information for management of the TDMS. The TDFL includes the actual replacement information (LOW, DFL entries). The SRRI is management information for an SRR (Sequential Recording Range) recorded in the user data area. The term Sequential Recording Range as used herein corresponds to "track" in the context of, for example, CDs or DVDs.

FIGS. 6A to 6C show the configuration of the TDMS update units.

Each of the TDMS update units includes a TDDS having a size of 1 sector. The TDDS is arranged in the last sector (data frame) of a cluster constituting the TDMS update unit.

If the TDMS update unit includes a TDFL, the TDFL is arranged within a required number of sectors (data frames) from the beginning of the TDMS update unit.

If the TDMS update unit includes an SRRI, the SRRI is arranged at the end of the TDMS update unit, that is, within a required number of sectors (data frames) immediately preceding the TDDS.

FIG. 6A shows an example of a TDMS update unit including an SRRI and a TDDS. The TDMS update unit has a size of, for example, 1 cluster, with the TDDS arranged in the last sector (data frame 31). Supposing that the size of the SRRI is M sectors, the SRRI is arranged in the M sectors (from data frame (31-M) to data frame 30) immediately preceding the TDDS.

Since no TDFL is recorded in this case, the area from data frame 0 to data frame (30-M) is set as zero data (00h).

FIG. 6B shows an example of a TDMS update unit including a TDFL and a TDDS. The TDMS update unit has a size of, for example, K clusters, with the TDDS arranged in the last sector (data frame 31 of cluster K). Supposing that the size of the TDFL is N sectors, the TDFL is arranged in the N sectors (from data frame 0 of cluster 0 to data frame (x−1) of cluster K) from the beginning of the TDMS update unit. It should be noted that x=mod(N/32)−1.

Since no SRRI is recorded in this case, the area from data frame x of cluster 0 to data frame 30 is set as zero data (00h).

FIG. 6C shows an example of a TDMS update unit including a TDFL, an SRRI, and a TDDS. The TDMS update unit has a size of, for example, K clusters, with the TDDS arranged in the last sector (data frame 31 of cluster K). Supposing that the size of the TDFL is N sectors, the TDFL is arranged in the N sectors (from data frame 0 of cluster 0 to data frame (x−1) of cluster K) at the beginning of the TDMS update unit.

Further, the SRRI is arranged in the M sectors (from data frame (31-M) of cluster K to data frame 30) immediately preceding the TDDS.

If there is a remaining area between the TDFL and the SRRI as shown in the drawing, the area is filled with zero data (00h).

It is needless to mention that the number of clusters constituting the TDMS update unit varies depending also on the size of the TDFL or SRRI.

FIG. 7 shows a state in which TDMS update units are additionally recorded. For example, a TDMS update unit #1 having a size of 2 clusters is recorded first, and then TDMS update units #2, #3 . . . #x . . . #y are additionally recorded.

For example, if updating of the TDFL is required or if updating of the SRRI is required or, further, if updating of both the TDFL and the SRRI is required, a TDMS update unit with a required configuration as represented by any one of FIGS. 6A to 6C is additionally recorded. For example, when updating of the SRRI is required but updating of the TDFL is not required, the configuration of FIG. 6A is adopted.

In FIG. 7, the TDMS update unit #y is the latest TDMS update unit. Since the TDMS update unit always includes the TDDS, the TDDS of the TDMS update unit #y serves as the latest valid TDDS.

The valid SRRI or TDFL is indicated by the latest TDDS.

The TDMS update unit #y in this example is recorded for updating of the SRRI. Therefore, an SRRIn in the TDMS update unit #y is indicated as a valid SRRI by the latest TDDS.

Also, if a TDFLm in the TDMS update unit #x is a valid TDFL at this point, by the latest TDDS, the TDFLm in the TDMS update unit #x is indicated as a valid TDFL.

That is, for the TDMSs additionally recorded as required after the cluster CL3 in the TDMA shown in FIG. 5C, the TDDS in its latest TDMS update unit is indicated as a valid TDDS, and the latest SRRI, TDFL is indicated by that TDDS.

3-2 TDDS

FIGS. 8A and 8B show the structure of a TDDS (temporary disc definition structure) that is recorded as the last sector in the TDMS update unit as mentioned above.

A TDDS includes 1 sector (2048 bytes). The TDDS includes the same contents as those of the DDS in the DMA described in FIG. 4. While the DDS has a size of 1 cluster (65536 bytes), as described in FIG. 4, in the DDS, substantial definitions are given only up to the byte position 59 in data frame 0. That is, its substantial contents are recorded within the first sector (data frame) of 1 cluster. Thus, even if a TDDS has a size of 1 sector, the TDDS can contain the substantial contents of the DDS>

Since the TDDS is recorded in the last sector of the last cluster of the TDMS update unit, the TDDS is recorded at the byte positions 0 to 2047 in data frame 31.

The contents of the TDDS from the byte positions 0 to 53 are the same as those of the DDS. That is, when the DDS is recorded upon finalization, the above contents in the latest TDDS are reflected on the DDS and recorded.

It should be noted that up to the byte position 53 of the DDS and TDDS, the "TDDS Update Count" at the byte positions 4 to 7 corresponds to the number of updates performed on the DDS in the case of DDS, as will be appreciated by referring to FIG. 4. In the case of the TDDS, this information represents a value indicating the number of times the TDDS is created. Further, in the TDDS, the "first PSN of Defect List (P_DFL)" (the first PSN of the Defect List) at the byte positions 24 to 27 takes a value of 0 until a disc closing process (process of prohibiting any further additional recording) is performed.

For the DDS to be written into the DMA upon the closing process, the value at the byte positions 4 to 7 of the latest TDDS at finalization is written to the byte positions 4 to 7 of the DDS, and the first PSN of the Defect List at the byte positions 24 to 27 is written.

In this case, the byte positions 53 to 55 and the byte positions 57 to 63 sandwiching the 1 byte corresponding to the "Pre-write Area Flags" at the byte position 56 are both filled with 0s as reserved areas. Further, the byte positions 64 to 71 indicate "Status bits of INF01/PAC1 locations on L0", and the byte positions 72 to 79 indicate "Status bits of INF01/PAC2 locations on L0". Further, the byte positions 80 to 87, and the byte positions 88 to 95 indicate "Status bits of INF01/PAC1 locations on L1" and "Status bits of INF01/PAC2 locations on L1", respectively. Valid information is written to these areas in the case of a dual layer disc. Further, the area from the byte positions 96 to 1023 is a reserved area.

Pieces of information that do not exist in the DDS are recorded from the byte position 1024 of the TDDS onwards.

1 byte at the byte position 1024 indicates Recording Mode indicating the disc recording mode. 1 byte at the byte position 1025, and 2 bytes at the byte positions 1026 and 1027 are respectively set as general flag bits and Inconsistency flags, and 4 bytes at the byte positions 1028 to 1031 serve as a reserved area.

4 bytes from the byte position 1032 to the byte position 1035 records the last recorded physical sector address PSN in the user data area. Further, 4 bytes at the byte positions 1036 to 1039 serve as a reserved area.

4 bytes at the byte positions 1040 to 1043 are allocated as a TDMS size recording area.

That is, 4 bytes at the byte positions 1040 to 1043 records the size of the TDMA in the ISA (Size of TDMA in Inner Spare Area 0), that is, the size information of the TDMS1. 4 bytes at the byte positions 1044 to 1047 records the size of the TDMA in the OSA (Size of TDMA in Outer Spare Area (s)), that is, the size information of the TDMA2.

Further, 4 bytes at the byte positions 1048 to 1051 records the size of the TDMA in the ISA1 (Size of TDMA in Inner Spare Area 1) in the case of a dual layer disc described later.

36 bytes at the byte positions 1052 to 1087 serve as a reserved area.

At the byte positions 1088 to 1095, and at the byte positions 1104 to 1111, information on the test Zone and calibration zone are respectively recorded. That is, the byte positions 1088 to 1091 indicate "next available PSN of Test Zone on L0", and the byte positions 1092 to 1095 indicate "next available PSN of Test Zone on L1". Also, the byte positions 1104 to 1107 indicate "next available PSN of Drive Calibration Zone on L0", and the byte positions 1108 to 1111 indicate "next available PSN of Drive Calibration on L1".

8 bytes at the byte positions 1096 to 1103 serve as a reserved area. Also, 8 bytes at the byte positions 1112 to 1119 serve as a reserved area.

4 bytes at the byte positions 1120 to 1123 indicate the first PSN of the first cluster of the TDFL (First PSN of 1st Cluster of DFL).

Likewise, every subsequent 4 bytes indicate the first PSNs of the second to eighth clusters of the TDFL.

The first PSN of the first cluster of the TDFL to the first PSN of the eighth cluster of the TDFL serve as TDFL pointers, and valid TDFLs are indicated by using these TDFL pointers as shown in FIG. 7.

32 bytes at the byte positions 1152 to 1183 serve as a reserved area.

4 bytes at the byte positions 1184 to 1187 indicate the first PSN of the SRRI (First PSN of SRRI). The first PSN of the SRRI serves as an SRRI pointer, and a valid SRRI is indicated by using this SRRI pointer as shown in FIG. 7.

4 bytes at the byte positions 1188 to 1191 indicate the first PSN of the SBM in the case of a dual layer disc (first PSN of SMB for L1).

24 bytes at the next byte positions 1192 to 1215 serve as a reserved area.

4 bytes at the byte positions 1216 to 1219 indicate the address to be recorded to next in the ISA (Next available PSN of ISA0).

Also, 4 bytes at the byte positions 1220 to 1223 indicate the address to be recorded to next in the OSA (Next available PSN of OSA0).

When the ISA or OSA is used due to a replacement process, these values are updated to indicate the addresses to be written to next.

4 bytes at the byte positions 1224 to 1227 indicate the address to be recorded to next in the OSA1 (Next available PSN of OSA1) in the case of a dual layer disc. 4 bytes at the byte positions 1228 to 1231 indicate the address to be recorded to next in the ISA1 (Next available PSN of ISA1) in the case of a dual layer disc.

684 bytes at the byte positions 1232 to 1915 serve as a reserved area.

4 bytes at the byte positions 1916 to 1919 indicate information on the year, month, and date of recording (Year/Month/Date of Recording).

Further, byte positions 1920 to 2048 indicate Drive ID. As this Drive ID, as illustrated in the drawing, Manufacturers Name (48 bytes), Additional ID (48 bytes), and Unique Serial Number (32 bytes) are recorded.

3-3 TDFL

Next, the configuration of the TDFL (Temporary DFL) will be described. As described above, the TDFL is updated by being included in the TDMS update unit.

In FIG. 9, the Cluster Number/Data Frame Number indicates cluster numbers within the TDFL, and 2048-byte sector units. The Byte position in Data frame indicates byte positions in each data frame.

As for the contents of the TDFL, the byte positions 0 to 64 indicate a TDFL header (Temporary Defect List Header) including TDFL management information.

This TDFL header includes information such as information for identifying the corresponding cluster as a TDFL cluster, the version, the TDFL update (TDFL recording/update) count, and the number of entries of the TDFL information block (DFL/LOW entries).

Bytes from the byte position 64 onwards indicate a Temporary list of Detects including a plurality of information blocks. The size of each information block is 8 bytes. If N information blocks exist, the size of the Temporary list of Detects is N×8 bytes.

One information block of 8 bytes represents one piece of replacement information, and serves as a DFL entry or LOW entry.

Although the DFL entry and the LOW entry are substantially the same replacement information, for the convenience of description, the DFL entry is set as replacement information for a defect area, and the LOW (Logical Overwrite) entry is set as replacement information used for a data overwrite.

Since the DFL and LOW entries represent substantially the same process (replacement process), these entries may coexist as information blocks within the Temporary list of Defects.

The Temporary list of Defects is a collection of a plurality of DFL entries and LOW entries. The total combined number of the DFL entries and LOW entries is 32759 at maximum in the case of a one-layer disc.

A Temporary Defect List Terminator of 8 bytes is recorded immediately after the Temporary list of Defects to indicate that the Temporary list of Defects is terminated herein. Thereafter, 0s are filled up to the end of that cluster.

The configuration of the 8-byte DFL entry constituting each individual information block is shown in FIG. 10A. It should be noted that the same format applies to the LOW entry.

Of the 8 bytes (=64 bits), the 4 bits of the bits b63 to b60 indicate Status 1.

The 28 bits of the bits b59 to b32 indicate the original cluster address (Original Cluster First PSN).

The 4 bits of the bits b31 to b28 indicate Status 2.

The 28 bits of the bits b27 to b0 indicate the replacement cluster address (Replacement Cluster First PSN).

The meaning of Status 1, 2 is shown in FIG. 10B.

In the case of Status 1, 2 being "0000", "0000", the corresponding DFL entry (or LOW entry) is normal replacement information.

That is, a replacement process of 1 cluster is indicated by the original cluster address and the replacement cluster address recorded in that entry. That is, an entry is created to describe a replacement process based on defect detection, or a replacement process for data overwrite.

In the case of a DFL entry indicating defect replacement, the replacement cluster address is an address in the spare area (ISA or OSA) shown in FIG. 1.

In the case of a LOW entry due to a replacement process for data overwrite, the replacement cluster address is a selected address within the user data area. It should be noted, however, that the replacement cluster address may be selected from within the ISA or OSA.

In the case of Status 1, 2 being "0001", "0000", the corresponding DFL entry indicates a defect cluster that has not been replaced.

In this regard, there may be a case where a replacement process using ISA or OSA cannot be performed even when a defect cluster is discovered at the time of data writing or the like. In such a case, although no replacement process is performed, the defect cluster is registered as one DFL entry.

Status 1, 2 of that DFL entry is "0001", "0000", so the defect cluster is indicated as the original cluster of the bits b59 to b32. Since no replacement cluster exists in this case, zero data is written at the bits b27 to b0, for example.

In the case of Status 1, 2 being "0000", "0001", the corresponding entry indicates the start address of burst block replacement.

In the case of Status 1, 2 being "0000", "0010", the corresponding entry indicates the end address of burst block replacement.

Burst block replacement refers to a replacement process for replacing a plurality of physically contiguous clusters at once.

That is, in an entry with Status 1, 2 being "0000", "0001", the first PSN of the first cluster within a range of a plurality of clusters to be replaced, and the first PSN of the first cluster within a range of a plurality of replacement clusters are recorded.

Also, in an entry with Status 1, 2 being "0000", "0010", the first PSN of the end cluster within a range of a plurality of clusters to be replaced, and the first PSN of the end cluster within a range of a plurality of replacement clusters are recorded.

These two entries allow a range of a plurality of contiguous clusters to be managed collectively for a replacement process. That is, when replacing/managing a plurality of physically contiguous clusters at once, it is not necessary to create one entry for every one of the plurality of clusters, but it suffices to create two entries respectively for the first cluster and the end cluster.

While the DFL and LOW entries coexist in the same format within the TDFL, when the disc according to this embodiment is loaded into a device with no data rewrite capability, both the DFL and LOW entries are interpreted as the DFL entries, and clusters read at the time of playback are replaced in a normal manner, thus ensuring the playback compatibility.

3-4 SRR and SRRI

Next, a description will be given of the SRR (Sequential Recording Range) and the SRRI (Sequential Recording Range Information).

The structure of the SRR is shown in FIGS. 11A to 11C. The SRR refers to a write area (Sequential Recording Range) used in the Sequential Recording Mode with respect to the write-once disc according to this embodiment, and has the following features <1> to <5> similar to a track on the CD.

<1> Within the SRR, recording is performed in the address increasing direction, and the SRR can have only one recordable address (additional recording point). The address as the additional recording point is referred to as NWA (Next Writable Address, PSN).

As shown in FIG. 11A, if the last recorded address within the SRR is LRA (Last Recorded Address, PSN), the NWA is represented by the following equations.

$$NWA = (ip(LRA/32)+1)*32 \text{(when } LRA \neq 0)$$

$$NWA = \text{Start PSN of the SRR (when } LRA=0)$$

Here, ip(N) represents the largest integer smaller than N.

That is, if data has been recorded in the SRR, the NWA becomes the first address (PSN) of the next cluster of the cluster including the LRA. If no data has been recorded in the SRR, the NWA is the first address (PSN) of the SRR.

<2> The SRR takes either of Open or Closed status.

In this regard, the Open SRR in FIG. 11A represents an SRR that is recordable (i.e., having the NWA), and the Closed SRR in FIG. 11B represents an SRR that is not recordable (i.e., not having the NWA).

<3> A process of securing the Open SRR on the disc is called reserving of an SRR, and a process of changing the Open SRR status to the Closed status is called closing of an SRR.

<4> A plurality of (a maximum of 7927) SRRs may exist on the disc, of which up to 16 Open SRRs may exist at the same time.

<5> SRRs to be written to can be selected in an arbitrary order.

In the actual operation, an open SRR is reserved when a file system management area is secured ahead of file data, and file system management information is recorded into the file system management area after the file data is recorded onto the disc.

FIG. 11C shows the disc sampling layout when recording is being performed in the Sequential Recording Mode.

Four SRRs (SRR#1 to SRR#4) exist on this disc, and the SRR#1, the SRR#3, and the SRR#4 are Open SRRs, and the SRR#2 is a Closed SRR.

When additionally recording data onto this disc, the recording can be performed from any one of the NWA1, NWA3, and NWA4.

As the information for managing the SRR as described above, SRRI is recorded by the above-mentioned TDMS update unit.

FIG. 12 shows the configuration of the SRRI.

The SRRI includes data frames 1 to 31.

The Relative Data Frame in FIG. 12 indicates individual data frames within the cluster. As described above, since the SRRI is arranged immediately before the TDDS recorded in data frame 31 as the last date frame of the TDMS update unit, if the SRRI has a size of M sectors, the SRRI is arranged in data frame (31-M) to data frame 30. The Byte position in Data frame indicates the byte position within each data frame.

The first 64 bytes of the SRRI indicate SRRI Header including SRRI management information.

This SRRI Header includes information such as information for identifying the corresponding cluster as an SRRI cluster, the version, the SRRI Update (SRRI recording/update) Count, and the total number of SRR entries (blocks indicating SRR information).

The bytes from the byte position 64 onwards indicate a list made up of a plurality of SRR entries (List of SRRI Entries).

The size of each SRR entry included in the list (List of SRRI Entries) is 8 bytes. If N SRR entries exist, the size of the list is N×8 bytes.

An SRRI Terminator of 8 bytes is recorded immediately after the last SRR entry. Thereafter, 0s are filled up to the end of that cluster.

The structure of the SRRI Header is shown in FIG. 13A.

2 bytes at the byte positions 0 to 1 indicate SRRI-ID (SRRI Identifier) including SRRI management information.

1 byte at the byte position 2 indicates SRRI Format indicating the version of the SRRI format.

4 bytes at the byte positions 4 to 7 indicate SRRI Update Count indicating the number of updates performed on the SRRI.

4 bytes at the byte positions 12 to 15 indicate the Number of SRR Entries indicating the total number of SRR entries.

1 byte at the byte position 16 indicates the Number of Open SRRs indicating the total number of SRRs whose status is Open.

From the byte position 20 onwards, a list compiling all of Open SRR numbers (List of Open SRR Numbers) is recorded.

The structure of this list (List of Open SRR Numbers) is shown in FIG. 13B. Each Open SRR Number is described by 2 bytes, and a total of 16 Open SRR Numbers are described by 32 bytes. If the total number of Open SRRs is less than 16, the reminder of the list (List of Open SRR Numbers) is filled with 0s. Every time the total number of Open SRRs increases or decreases, the contents of the list (List of Open SRR Numbers) must be corrected and sorted in the descending order.

Figure 14:
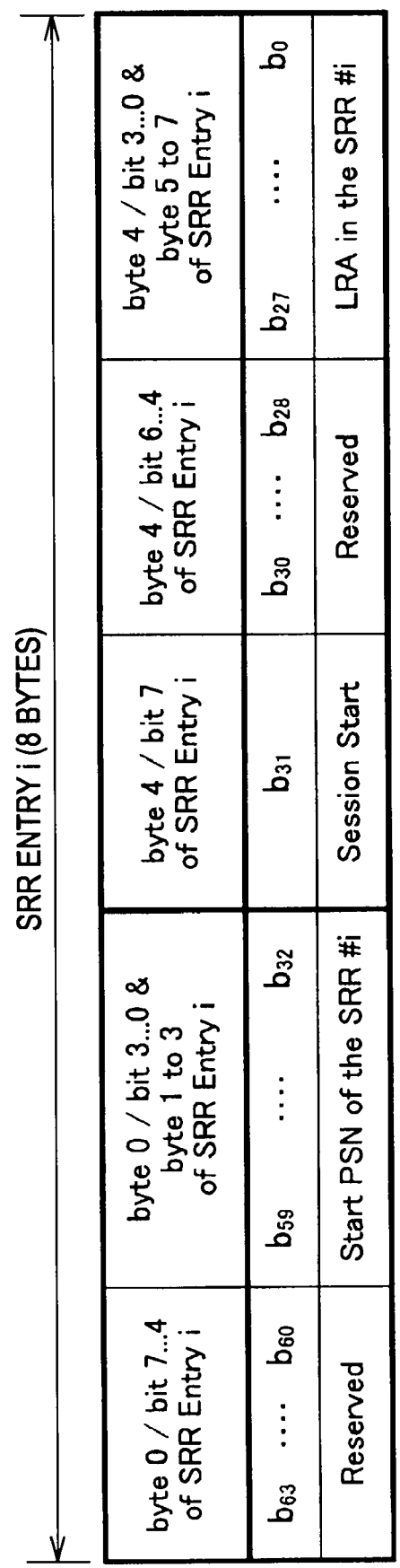
FIG. 14 is an explanatory diagram of an SRR entry of a disc according to an embodiment of the present invention.

FIG. 14 shows the configuration of the SRR entry that is to be registered into the entry list (List of SRRI Entries) in FIG. 12 subsequent to the above-mentioned SRRI Header. The entry number is set as i.

Each individual SRR entry indicating a given SRR is 8 bytes (64 bits) long.

The 4 bits of the bits b63 to b60 are reserved (undefined).

The 28 bits of the bits b59 to b32 indicate the start address of an SRR #i that exists in the user data area. That is, the first PSN of the start cluster of the SRR #i is indicated.

The bit b31 indicates a session start. The bit b31 indicates whether or not this SRR is the first SRR of a session. If this bit is 1, this indicates that this SRR is the first SRR of a session, that is, a session starts from this SRR.

The 3 bits of the bits b30 to b28 are reserved (undefined).

28 bits of the bits b27 to b0 indicate the LRA (Last Recorded Address: see FIG. 11), represented in PSN, in the SRR #i.

As described above, the number and addresses of SRRs that exist in the user data area, and further the LRA of each SRR are managed on the basis of the SRRI including SRRI Header and SRR entries. Further, as described above, the NWA (Next Writable Address) of an open SRR can be calculated from the value of the LRA (Last Recorded Address) in an SRR entry corresponding to that SRR.

Such SRRI is updated by being included in the above-mentioned TDMS update unit when updating of the management state of the SRR is required, such as when the SRR is reserved, when additional recording is performed from the NWA in the SRR, or when the SRR is closed.

3-5 Replacement Process Using Spare Area

Here, a description will be given of a replacement process using the ISA, OSA as a fixed spare area.

The ISA (Inner Spare Area) and the OSA (Outer Spare Area) are secured on the inner radius side and the outer radius side in the data zone as spare areas for the replacement process of defect clusters.

The size of the ISA, OSA is defined within the above-described DDS, TDDS.

The size of the ISA, OSA is determined at initialization, and the size remains fixed thereafter.

A replacement process of a defect cluster using the ISA, OSA is performed in the manner as described below.

For example, at the time of data writing based on a request from a host device, if the cluster specified as the write address is a defect cluster, it may be difficult to execute appropriate data recording. In that case, the data to be recorded is written to a given cluster within the ISA or OSA. This is referred to as a replacement process.

This replacement process is managed by the above-mentioned DFL entries. That is, one DFL entry is registered with the address of a defect cluster for which data recording cannot be executed set as the original cluster address, and the address of a cluster for which data has been written into the ISA or OSA set as the replacement cluster address.

It should be noted that when there is a request for writing over an already recorded address, that is, a data overwrite request, the replacement cluster for actually recording the data to be written to the target address is selected from within the user data area, for example, at the NWA in the SRR.

In the case of data rewriting as well, a LOW entry corresponding to the replacement may be registered. Since data position replacement due to rewriting is managed by the LOW entries in the TDFL in the TDMA, even through the disc is a write-once disc, data overwrite can be realized in a practical sense (for example, as seen from the OS of the host system, the file system, or the like).

3-6 Additional Recording Process to Next TDMA

FIGS. 15A to 15E are diagrams illustrating an additional recording process to the next TDMA, and schematically shows the boundary part between the lead-in zone and the data zone, and the structure of the TDMA0 provided in the lead-in zone. In this case, the TDMA1 is set in the Inner Spare Area.

Figure 15:
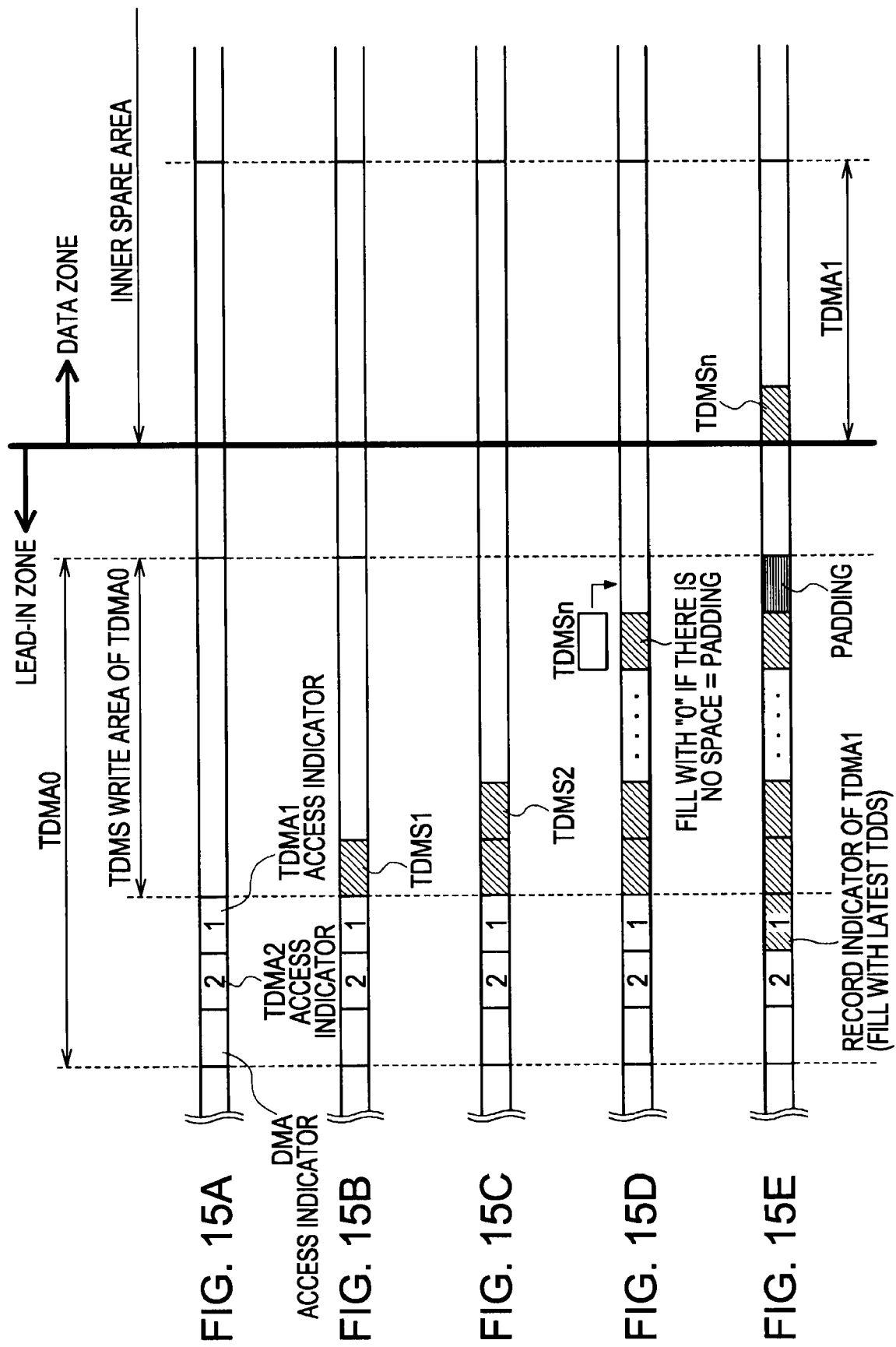
FIGS. 15A to 15E are explanatory diagrams of an additional recording process to the next TDMA.

As already described above, the first 3 clusters of the TDMA0 in the lead-in zone are allocated as access indicator recording areas. As shown in FIG. 15A, the first cluster CL0 serves as a DMA access indicator, the next cluster CL1 serves as a TDMA2 access indicator, and the further next cluster CL2 serves as a TDMA1 access indicator. In the state shown in FIG. 15A, data has not been written to any of the areas of the TDMA1 access indicator, the TDMA2 access indicator, and the DMA access indicator. Also, data has not been written to the TDMS write area of the TDMA0, either. That is, FIG. 15A shows a case in which the disc is a blank disc.

Now, suppose a case where data recording is performed several times with respect to the user data area from the state shown in FIG. 15A and thus, as shown in FIGS. 15B and 15C, TDMS update units are additionally recorded gradually in the order of the TDMS1, TDMS2, and so on.

It should be noted that, as indicated by such a transition from FIG. 15A to FIG. 15B and then to FIG. 15C, information is recorded to none of the TDMA access indicators as long as additional recording of a TDMS update unit is being performed within the TDMA0. That is, if no data has been written in the TDMA access indicators, this means that the disc is a blank disc, or that the latest TDMS exists within the TDMA0.

Suppose a case where TDMSs are additionally recorded gradually as mentioned above and, for example, at the N-th additional recording of a TDMS update unit (additional recording of a TDMSn), there is no more space area in the TDMS write area of the TDMA0 to which the TDMSn can be written as shown in FIG. 15B.

When there is no more area for additional recording as mentioned above, additional recording of a TDMS with respect to a new TDMA is performed.

In this case, however, rather than additionally recording a TDMS to the next TDMA1 immediately, as shown in FIG. 15E, the remaining area within the TDMS write area of the TDMA0 is subjected to padding. That is, the remaining area within the TDMS write area of the TDMA0 is filled with 0s.

Thereafter, additional recording of a TDMS (in this case, the TDMSn) into the TDMA1 is performed.

Although not shown, in a case when additionally recording a TDMS with respect to the TDMA2 as well, likewise, if a space area remains in the TDMA1 preceding the TDMA2, padding is performed with respect to that area.

When additionally recording a TDMS to the next TDMA as described above, in accordance with this additional recording, information is recorded into the corresponding TDMA access indicator. When additionally recording a TDMS to the TDMA1 for the first time, information recording is performed with respect to the TDMA1 access indicator. Also, when additionally recording a TDMS to the TDMA2 for the first time, information recording is performed with respect to the TDMA2 access indicator.

In this regard, FIG. 16 shows the structure of data in the TDMA access indicator in a case where information is recorded in response to a TDMS being additionally recorded for the first time with respect to the next TDMS as described above. As shown in FIG. 16, the data structure of the TDMA access indicator is such that its entire 32-sector area is filled up with 32 copies of the latest TDDS.

That is, in response to additional writing to the TDMA1 performed for the first time, the TDMA1 access indicator is filled up with copies of the TDDS in the TDMS additionally written into that TDMA1. Likewise, in response to additional writing to the TDMA2 performed for the first time, the TDMA2 access indicator is filled up with copies of the TDDS in the TDMS additionally written into that TDMA2.

As described above with reference to FIGS. 8A and 8B, information on TDMA size is stored in the TDDS, and the first address and end address of each TDMA can be calculated from that information (and the first address of the TDMA1 and the end address of the TDMA2 that are fixed). Once these first address and end address are obtained, the TDDS of the latest TDMS in the TDMA indicated by an access indicator can be obtained by determining the latest recorded address between these addresses. As already described above, the TDDS is written to the last sector in the TDMS.

In this way, the TDMA access indicator has, in addition to a function of indicating in which TDMA the latest TDMS exists on the basis of whether or not information has been written in the TDMA access indicator, a function of pointing to the location of the latest TDDS as mentioned above.

Although not illustrated in the drawing, at disc finalization, the DMA access indicator is filled up with copies of the DDS created on the basis of the latest TDDS at that time. That is, the DMA access indicator has a function of indicating whether or not the disc has been finalized on the basis of whether or not information has been written in the DMA access indicator, and also pointing to the location of the DDS on the basis of the contents of the written information.

4. Configuration of Disc Drive Device

Next, an example of the configuration of a disc drive device (disc drive device 10) adapted to write-once optical discs as described above will be described with reference to FIG. 17.

The disc drive device 10 can create the disc layout as described with reference to FIG. 1 by applying formatting to a write-once disc, for example, a disc in a state as shown in FIG. 1 in which only the prerecorded information area PIC has been created but no data has been recorded in the write-once area. Further, the disc drive device records and plays back data to and from the user data area of the disc thus formatted. If necessary, the disc drive device also updates a TDMA.

Figure 17:
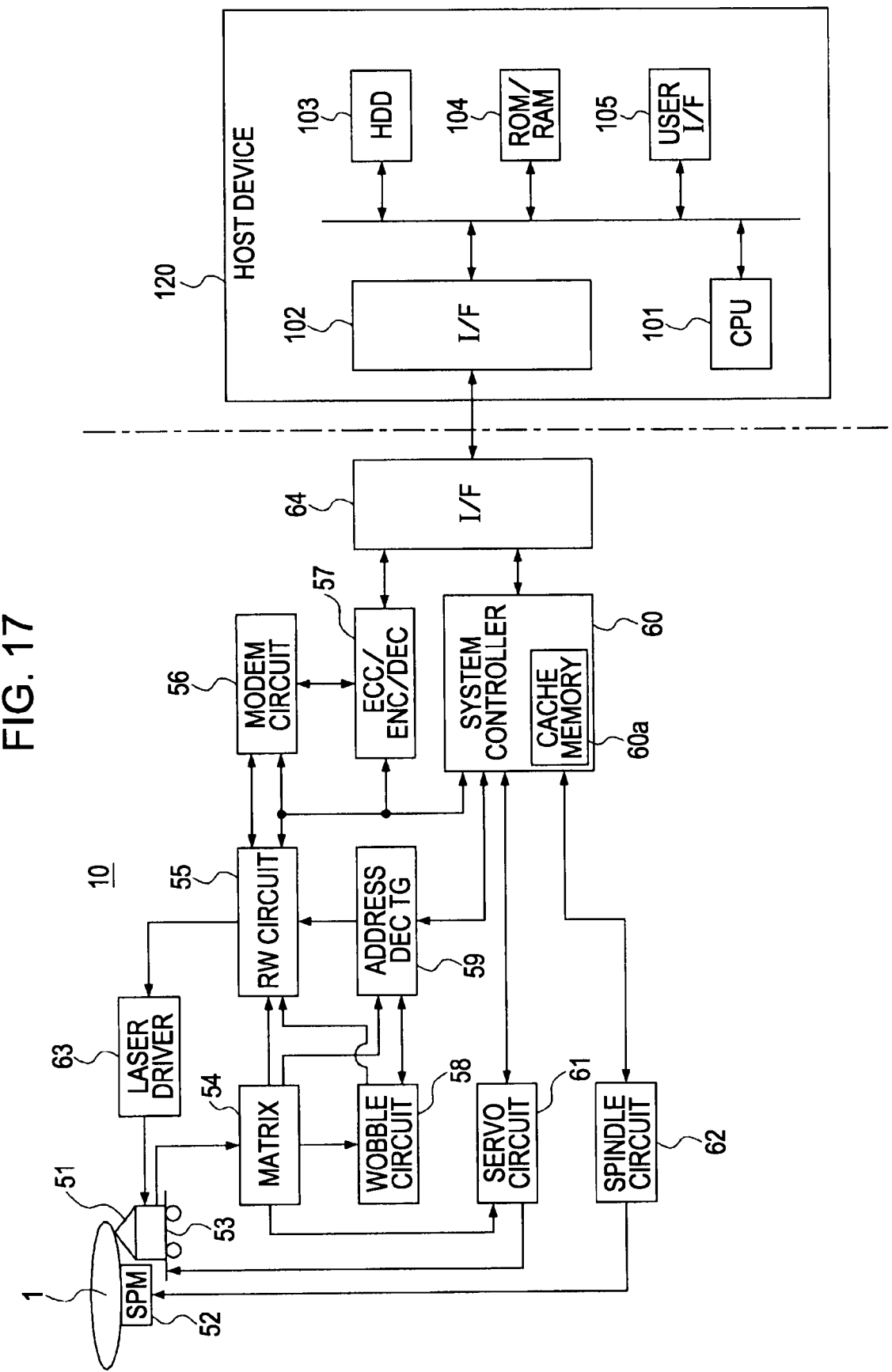
FIG. 17 is a block diagram showing the internal configuration of a disc drive device according to an embodiment of the present invention.

A disc 1 loaded into the disc drive device 10 in FIG. 17 is the above-described write-once disc. It should be noted that the disc drive device 10 is also capable of performing recording and playback to and from a rewriteable disc or playback from an ROM disc.

The disc 1 is placed on a turntable (not shown). During the recording/playback operation, the disc 1 is rotationally driven at a CLV (constant linear velocity) by a spindle motor 52.

Then, an optical pickup (optical head) 51 reads management/control information as ADIP addresses or pre-recorded information embedded as wobbling of groove tracks on the disc 1.

At the time of initialization/formatting, or at the time of recording user data, management/control information or user data is recorded in the track in the write-once area by the optical pickup. At the time of playback, the recorded data is read by the optical pickup.

Within the optical pickup 51, a laser diode as a laser light source, a photo-detector for detecting reflected light, an objective lens as an output end of laser light, and an optical system for radiating laser light onto a disc recording surface through the objective lens, and introducing the reflected light of the laser light to the photo-detector are formed (all not shown).

In the optical pickup 51, the objective lens is held so as to be movable in the tracking direction and the focus direction by a two-axis mechanism.

In addition, the optical pickup 51 as a whole can be moved in the radial direction of the disc by a thread mechanism 53.

The laser diode in the optical pickup 51 is driven to emit laser light by a drive signal (drive current) from a laser driver 63.

The information on the reflected light from the disc 1 is detected by the photo-detector within the optical pickup 51, and converted into an electrical signal according to the quantity of received light before being supplied to a matrix circuit 54.

The matrix circuit 54 includes a current/voltage conversion circuit, a matrix calculation/amplifier circuit, and the like in association with the output current from a plurality of light receiving elements constituting the photo-detector, and generates required signals by a matrix calculation process.

For example, the matrix circuit 54 generates a high frequency signal (playback data signal) corresponding to playback data, a focus error signal and a tracking error signal for servo control, or the like.

Further, the matrix circuit 54 also generates a push-pull signal as a signal related to groove wobbling, that is, a signal for detecting wobbling.

It should be noted that the matrix circuit 54 may sometimes be provided integrally within the pickup 51.

The playback data signal outputted from the matrix circuit 54 is supplied to a reader/writer circuit 55. The focus error signal and the tracking error signal are supplied to the servo circuit 61, and the push-pull signal is supplied to a wobble circuit 58.

The reader/writer circuit 55 carries out processing such as a binary conversion process on the playback data signal, and a process of generating a playback clock signal by a PLL technique to thereby play back the data read by the optical pickup 51, and supplies the generated data to a modem circuit 56.

The modem circuit 56 includes a functional part that serves as a decoder at the time of playback, and a functional part that serves as an encoder at the time of recording.

At the time of playback, the modem circuit 56 performs demodulation of a run-length limited code as a decoding process on the basis of the playback clock.

An ECC encoder/decoder 57 carries out an ECC encoding process for adding error correction codes at the time of recording, and an ECC decoding process for correcting errors at the time of playback.

At the time of playback, the ECC encoder/decoder 57 takes the data demodulated by the modem circuit 56 into an internal memory, and performs such processing as error detection/correction, de-interleaving, and the like to obtain playback data.

The data decoded into the playback data by the ECC encoder/decoder 57 is read on the basis of an instruction from a system controller 60, and is then transferred to a host device 120 connected to the ECC encoder/decoder 57 via an interface 64, for example, a personal computer or AV (Audio-Visual) equipment.

The push-pull signal that is outputted from the matrix circuit 54 as a signal related to wobbling of a groove is processed by the wobble circuit 58. The push-pull signal as AIP information is demodulated by the wobble circuit 58 into a data stream constituting an ADIP address, and the demodulated signal is supplied to an address decoder 59.

The address decoder 59 decodes the supplied data to obtain an address value, and supplies the address value to the system controller 60.

Further, the address decoder 59 generates clocks by a PLL process using the wobble signals supplied from the wobble circuit 58, and supplies the clocks to the respective component sections as encoding clocks for recording, for example.

As a push-pull signal that is outputted from the matrix circuit 54 as a signal related to groove wobbling, the push-pull signal as pre-recorded information PIC is bandpass-filtered in the wobble circuit 58 before being supplied to the reader/writer circuit 55. In the reader/writer circuit 55, the supplied signal is converted to a binary value to produce a data bit stream, which is ECC decoded and de-interleaved by the ECC encoder/decoder 57, and data as pre-recorded information is extracted. The extracted pre-recorded information is supplied to the system controller 60.

The system controller 60 can perform various operation settings, copy protection processing, etc., based on the read pre-recorded information.

Recording data is transferred from the host device 120 at the time of recording. This recording data is sent to a memory of the ECC encoder/decoder 57 via the interface 64 for buffering.

In this case, the ECC encoder/decoder 57 performs an encoding process on the buffered recording data, such as error correction coding, interleaving, and sub-coding.

The ECC encoded data is modulated by the modem circuit 56 according to, for example, RLL (1-7) PP, and the resulting data is supplied to the reader/writer circuit 55.

As encoding clocks that serve as reference clocks for the above-mentioned encoding process at the time of recording, as described above, the clocks that are generated from wobble signals are employed.

The recording data generated by the encoding process is subjected to a recording compensation process in the reader/writer circuit 55, including fine adjustment of the optimal recording power with respect to the properties of the recording layer, the configuration of the laser spot, the recording linear velocity, etc., and adjustment of the laser drive pulse waveform. Then, the resulting data is sent as laser drive pulses to the laser driver 63.

In the laser driver 63, the supplied laser drive pulses are applied to the laser diode in the pickup 51 to activate laser light emission. Thus, pits are formed in the disc 1 in accordance with the recording data.

The laser driver 63 includes a so-called APC (Auto Power Control) circuit, and controls the laser output so as to become constant irrespective of the temperature or the like, while monitoring the laser output power on the basis of the output of a laser power monitoring detector provided in the pickup 51. Target values of laser output at the time of recording and playback are given from the system controller 60. At the time of recording and playback, the laser driver 63 controls the respective laser output levels so as to become their target values.

The servo circuit 61 generates various servo drive signals, such as focus, tracking and thread servo drive signals, from the focus error signal and the tracking error signal from the matrix circuit 54 to carry out various servo operations.

Specifically, the focus drive signal and the tracking drive signal are generated based on the focus error signal and the tracking error signal to drive a focusing coil and a tracking coil of the two-axis mechanism in the pickup 51. Thus, a tracking servo loop and a focus servo loop are formed by the pickup 51, the matrix circuit 54, the servo circuit 61, and the two-axis mechanism.

The servo circuit 61 turns off the tracking servo loop in response to a track-jump command from the system controller 60, and outputs a jump-drive signal to execute a track-jump operation.

The servo circuit 61 also generates a sled error signal that is obtained as a low-frequency component of the tracking error signal, or a sled-drive signal based on access execution control or the like from the system controller 60 to thereby drive the sled mechanism 53. The sled mechanism 53 has a mechanism (not shown) including a main shaft for holding the pickup 51, a sled motor, a transmission gear, and the like. The sled motor is driven in accordance with the sled-drive signal to effect a required slide movement of the pickup 51.

A spindle servo circuit 62 controls the spindle motor 52 to perform CLV rotation.

The spindle servo circuit 62 obtains clocks generated by performing a PLL process on the wobble signals as the current rotational velocity information of the spindle motor 52, and compares the obtained information with predetermined CLV reference velocity information to generate a spindle error signal.

When playing back data, playback clocks (the reference clocks for a decoding process) generated by PLL in the reader/writer circuit 55 serve as the current rotational velocity information of the spindle motor 52. This information may be compared with predetermined CLV reference velocity information to generate a spindle error signal.

The spindle servo circuit 62 outputs a spindle drive signal generated in accordance with the spindle error signal, and executes CLV rotation of the spindle motor 52.

Also, the spindle servo circuit 62 generates a spindle drive signal in accordance with a spindle kick/brake control signal from the system controller 60, and causes the spindle motor 52 to execute such operations as start, stop, acceleration, and deceleration.

The above-described various operations of the servo system and recording/playback system are controlled by the system controller 60 that is implemented by a microcomputer.

The system controller 60 performs various kinds of processing in response to commands from the host device 120.

For example, when a write command is sent from the host device 120, first, the system controller 60 moves the pickup 51 to the address to be written to. Then, the data (for example, MPEG video data, audio data, or the like) that is transferred from the host device 120 is encoded by the ECC encoder/decoder 57 and the modem circuit 56 in the manner as described above. As described above, the laser drive pulses from the reader/writer circuit 55 are supplied to the laser driver 63, thus executing recording.

For example, when a read command requesting transfer of a given piece of data (MPEG video data or the like) recorded on the disc 1 is supplied from the host device 120, first, seeking control for the specified address is performed. Specifically, a command is issued to the servo circuit 61 to execute an operation of causing the pickup 51 to access the target address that is specified by the seek command.

Then, an operation control necessary for transferring data of the specified data segment to the host device 120 is performed. Specifically, data is read from the disc 1, decoding/buffering or the like is executed on the read data by the reader/writer circuit 55, the modem circuit 56, and the ECC encoder/decoder 57, and the requested data is transferred.

When recording and playback data, the system controller 60 can use the ADIP address detected by the wobble circuit 58 and the address decoder 59 to perform access or control of the recording/playback operation.

At a predetermined point in time, such as when the disc 1 is loaded, the system controller 60 executes reading of the unique ID recorded in the BCA of the disc 1 (if the BCA is formed) or the pre-recorded information (PIC) recorded as wobbled grooves in the read-only area.

In that case, first, a seek control for the BCA or a pre-recorded data zone PR is performed. Specifically, a command is issued to the servo circuit 61 to execute an operation of causing the pickup 51 to access the innermost radius side of the disc.

Then, the pickup 51 performs a playback trace to obtain a push-pull signal as reflected-light information, followed by execution of a decoding process by the wobble circuit 58, the reader/writer circuit 55, and the ECC encoder/decoder 57 to obtain playback data as BCA information or pre-recorded information.

Based on the read BCA information or pre-recorded information, the system controller 60 performs laser power settings, a copy protection process, and so on.

FIG. 17 shows a cache memory 60*a* within the system controller 60. The cache memory 60*a* is used for, for example, holding or updating a TDDS/TDFL/SRRI or the like read from the TDMA of the disc 1.

When, for example, the disc 1 that has not been finalized is loaded, the system controller 60 controls the respective component sections to execute reading of a TDDS/TDFL/SRRI recorded in the TDMA, and holds the read information in the cache memory 60*a*.

Thereafter, when a replacement process is carried out due to data write/rewrite or defect, the system controller 60 updates the SRRI, TDFL, or the like within the cache memory 60*a*.

When, for example, a replacement process is carried out due to data write or data rewrite operations, and the SRRI or TDFL is to be updated, a TDMS update unit may be additionally recorded in the TDMA (or ATDMA) of the disc 1 every time such updating is performed. However, in this case, consumption of the TDMA of the disc 1 becomes quicker.

Accordingly, in cases such as when data is additionally recorded and the LRA (Last Recorded Address) as the SRRI is updated, the following technique is employed. That is, the SRRI is updated within the cache memory 60*a* for a certain number of times, and the SRRI that has been updated within the cache memory is recorded onto the disc 1 by the TDMS update unit at a certain point in time.

Another conceivable technique is to perform updating of the TDFL/SRRI within the cache memory 60*a* until the disc 1 is ejected from the disc drive device, and upon ejection or the like of the disc 1, the last (latest) TDFL/SRRI within the cache memory 60*a* is written into the TDMA of the disc 1.

When implemented as, for example, a personal computer, the host device 120 includes a CPU 101, an interface 102, an HDD 103, a ROM/RAM 104, and a user interface 105.

The interface 102 performs communication of commands or recording/playback data with the disc drive device 10.

The HDD (Hard disk Drive) 103 is used for the storage of AV data, application programs, and the like.

The ROM/RAM 104 is used for the storage of programs activated by the CPU 101 or as a working area for the CPU 101.

The user interface 105 represents a part or device for performing inputs/outputs with respect to the user, for example, a display section for displaying video/letters such as a monitor display, a sound output section such as a speaker, and an operation inputting section such as a keyboard or switch.

The host device 120 uses the disc drive device 10 as an AV data storage in accordance with application programs activated by the CPU 101.

As the actual implementation mode of the host device 120, for example, a video camera, an audio system, an AV editing device, or other such various kinds of equipment are conceivable instead of a personal computer.

5. Management Information Acquiring Process of Related Art

As can be appreciated from the foregoing description, in the disc 1, the last recorded TDMS update unit becomes the latest TDMS. That is, by acquiring TDFL, SRRI information on the basis of this latest TDMS, the latest management information recorded on the disc 1 can be acquired.

In this regard, as described above with reference to FIG. 7, in the TDMS, the recording position of the latest TDFL, SRRI is pointed to by the TDDS recorded in the last sector of its latest cluster. Accordingly, in the related art, the operation of acquiring the latest management information from the disc 1 is performed in the manner as shown in FIG. 18 described below.

Figure 18A:
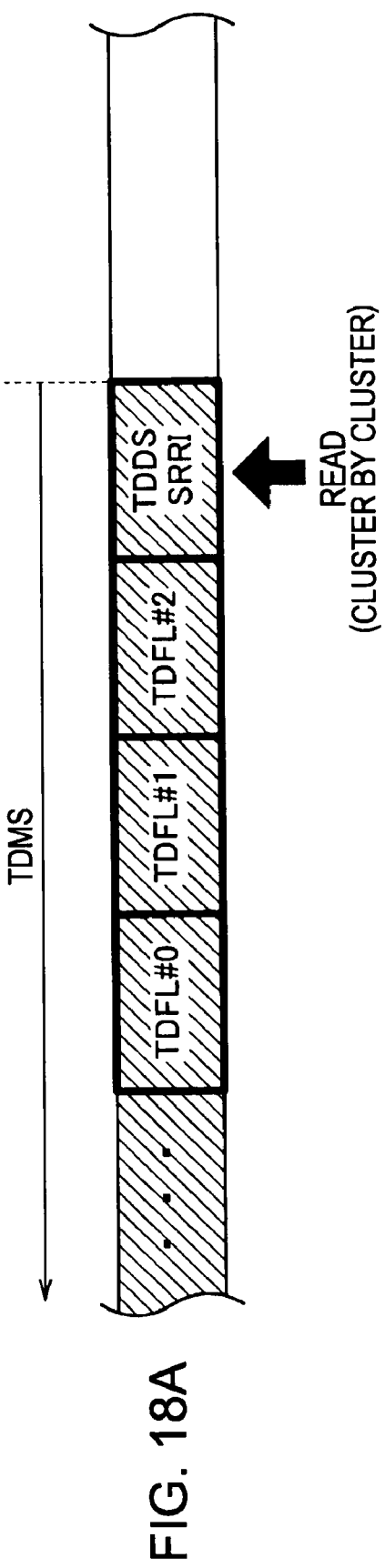
FIGS. 18A and 18B are diagrams illustrating a management information acquiring process according to the related art.
Figure 18B:
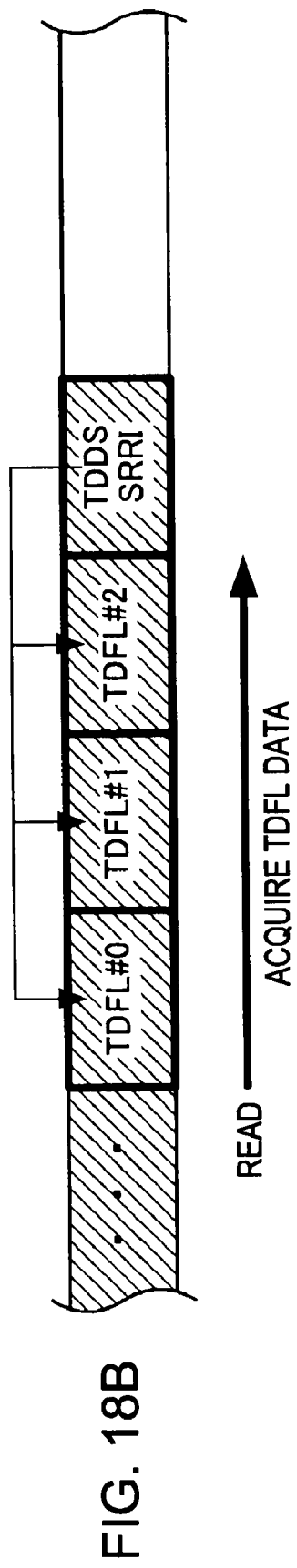

FIGS. 18A and 18B are diagrams illustrating a management information acquiring process according to the related art, and schematically show the last recorded TDMS update unit on the disc 1. It should be noted that the oblique lines in the drawing represent a recorded portion, and the blank portion represents an unrecorded portion. Also, the solid frames in the drawing indicate cluster-based subdivisions.

First, it is stated for confirmation that when searching for the last updated TDMS update unit as described above, the recording state of the access indicator area in the TDMA0 as shown in FIGS. 5A to 5D mentioned above is determined. As can be appreciated from the above description, within this access indicator area, the DMA access indicator indicates whether or not the disc 1 has been finalized on the basis of whether or not information has been recorded in this DMA access indicator. That is, if information has been recorded in this DMA access indicator, it is found that the disc 1 has been finalized. Accordingly, the latest management information is acquired from the DMA in this case.

On the other hand, if information has not been recorded in the DMA access indicator, it is found that the latest management information can be acquired from one of the TDMAs. In this case, in order to identify the TDMA in which the latest management information is recorded, the recording states of the TDMA2 access indicator and TDMA1 access indicator are checked. Specifically, if information has been recorded in the TDMA2 access indicator, it is found that the latest TDMS exists in the TDMA2. If information has been recorded only in the TDMA1 access indicator, it is found that the latest TDMS exists in the TDMA1. Further, if information has been recorded in neither of these TDMA access indicators, this means that the latest TDMS exists in the TDMA0, or that the disc is a blank disc. In that case, the recording state within the TDMS write area of the TDMA0 is checked, and if information has been recorded in this area, it is identified that the latest TDMS exists in the TDMA0.

When acquiring the latest TDDS from within the TDMA thus identified on the basis of the recording state of the TDMA access indicator, the last recorded address in that TDMA is searched for. This is because, as already described above, the latest TDDS is recorded with respect to the last sector in the last recorded TDMS update unit.

It should be noted that while the start address and end address of (the TDMS write area of) the TDMA0 are fixed as described above, only the start address is fixed in the case of the TDMA1, and only the end address is fixed in the case of the TDMA2. When searching for the last recorded address to acquire the latest TDDS, the search range must be set. Therefore, when searching for the last recorded addresses in the TDMA1 and the TDMA2, it is necessary to identify information of the end address for the TDMA1, and information of the start address for the TDMA2.

The TDMA1 access indicator and the TDMA2 access indicator described above are filled with TDDS information as shown in FIG. 16. That is, the TDMA access indicator is filled with the latest TDDS as of when the TDMS is recorded for the first time with respect to a TDMA associated with the TDMA access indicator. Since the size of each TDMA is stored in this TDDS as shown in FIGS. 8A and 8B, by acquiring the information of the TDDS in the access indicator, the information of the end address can be acquired for the TDMA1, and the information of the start address can be acquired for the TDMA2. When the TDMA1 is the latest one, the end address of the TDMA1 is calculated from the size information of the TDMA1 in the TDDS within the TDMA1 access indicator, and the last recorded address between the fixed start address and this calculated end address is searched for, thereby searching for the latest TDDS. When the TDMA2 is the latest one, the start address of the TDMA2 is calculated from the size information of the TDMA2 in the TDDS within the TDMA2 access indicator, and the last recorded address between the fixed end address and this calculated start address is searched for, thereby searching for the latest TDDS.

As for the TDMA0, the latest TDDS can be searched for by searching for the last recorded address between a preset fixed start address and the end address.

In this way, the last recorded address is searched for within the latest TDMA identified on the basis of the recording state of the access indicator area, thereby making it possible to search for the latest TDDS.

In FIG. 18A, in the related art, the latest TDDS identified as a result of the above-mentioned search for the last recorded address is read from the disc 1 first. Specifically, in this case, since the smallest readout unit is a cluster, data of 1 cluster including the TDDS is read from the disc 1.

Here, as already described above with reference to FIGS. 6A to 6C, within the last 1 cluster in the TDMS update unit, the TDDS is always stored in its last sector. In the segment preceding the TDDS, an area (variable) for storing the SRRI is provided, and in the segment preceding the SRRI, an area (variable) for storing the TDFL is provided.

FIG. 18A shows an example in which only the TDDS and the SRRI are stored in the last 1 cluster in the TDMS update unit. In this case, the TDFLs fit in the area of 3 clusters that precede this last cluster (TDFL#0 to TDFL#2 in the drawing).

In the example shown in this drawing, by reading the last 1 cluster in the TDDS identified by the search for the last recorded address as mentioned above, SRRI information is read in addition to the latest TDDS.

In the related art, the TDFLs are read as shown in FIG. 18B on the basis of the latest TDDS acquired by being read from the disc 1 in this way. That is, on the basis of the TDFL pointer information in the TDDS, data of each TDFL is read from the disc 1.

It should be noted that in this case, since reading of the SRRI information has been completed, the SRRI information pointed to by the SRRI pointer of the TDDS can be acquired from the read data (cache data).

6. Management Information Acquiring Process of this Embodiment

As mentioned above, in the related art, to acquire the latest TDFL, SRRI from TDDS information, data of 1 cluster including the TDDS is first read from the disc 1, and then the TDFL pointed to by pointer information in the thus acquired TDDS is read. The SRRI can be acquired from within the cache data.

However, as described above, according to this prior art method, a seek operation for reading the TDFL is required again after performing a seek operation for reading the TDDS. In this respect, the prior art method requires a considerable amount of time until the latest management information is read.

Figure 19:
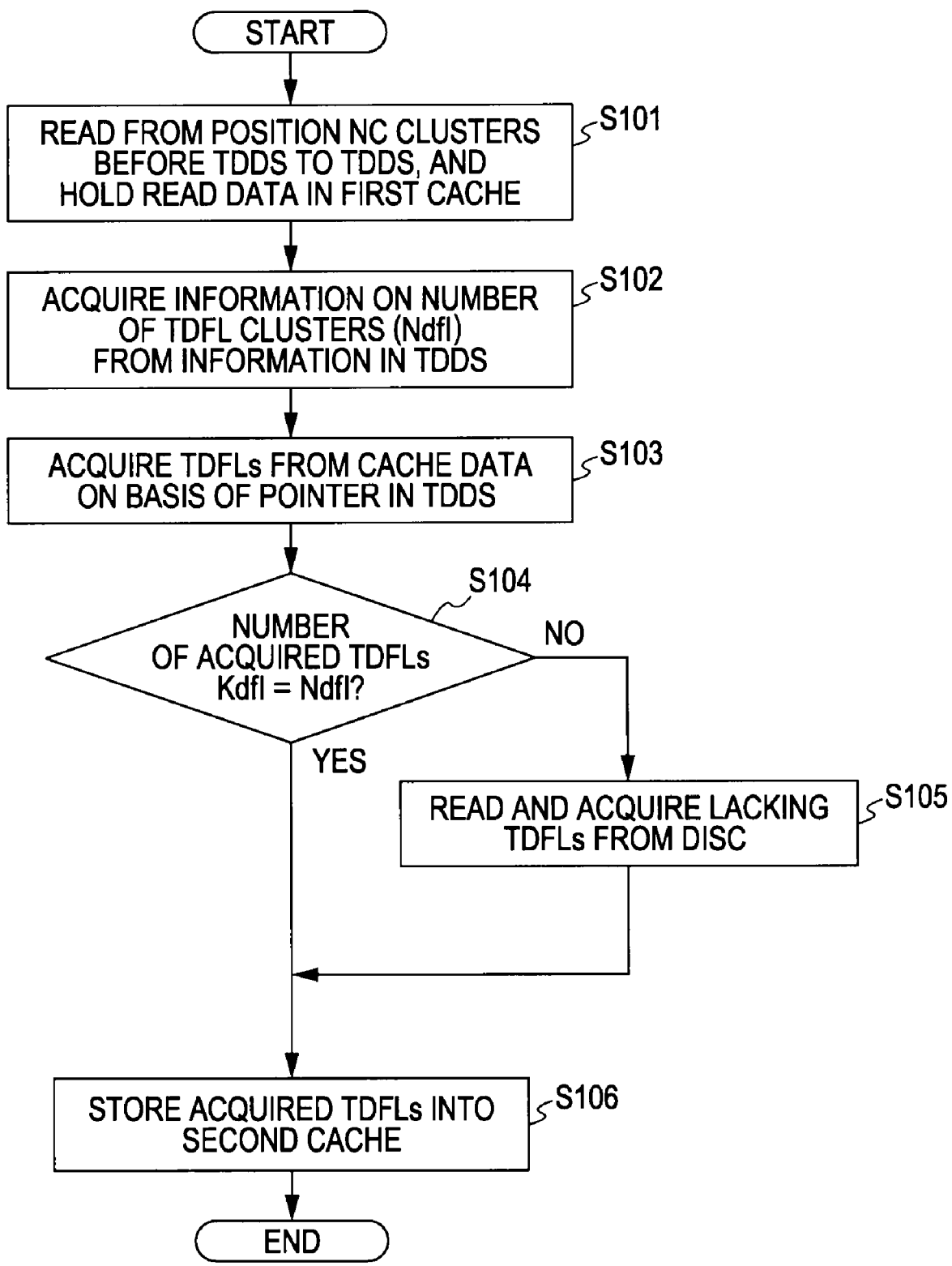
FIG. 19 is a flowchart showing a management information acquiring process according to an embodiment of the present invention.

Accordingly, in this embodiment, with a view to making the operation of acquiring the latest management information faster, the following management acquisition process as shown in FIG. 19 is performed.

It should be noted that the processing shown in FIG. 19 is performed by the system controller 60 shown in FIG. 17. Further, in this drawing, it is assumed that the TDMA in which the latest TDMS exists has already been identified on the basis of the recording state in the access indicator area, and that the recording address of the latest TDDS has been identified as a result of the search for its last recorded address.

In FIG. 19, first, in step S101, reading from a position NC clusters before the TDDS to the TDDS is executed, and a process for holding the read data in a first cache is executed.

That is, first, a read operation from the disc 1 is executed with respect to the segment from a position NC clusters before a cluster including the latest TDDS, which is identified as a result of the search for the last recorded address mentioned above, to the cluster including this TDDS. In this case, the value of "NC" mentioned above is, for example, a predetermined value set in advance.

Then, in step S101, the data thus read from the disc 1 with respect to the segment from the position NC clusters before the TDDS to the TDDS is held in a first cache area within the cache memory 60a.

In this regard, although not described with reference to FIG. 17 above, in this embodiment, the cache memory 60a is provided with the first cache area for storing data read from the disc 1, and a second cache area for storing various kinds of data (SRRI, TDFL) acquired from the data stored in the first cache area as will be described later.

The process from the subsequent steps S102 to S104 is a process for checking whether or not all the TDFLs are included in the read data.

That is, first, in step S102, information on the number of TDFL clusters (Ndfl) is acquired from the information in the TDDS. Specifically, information on the total number of TDFL clusters (Ndfl) is acquired by determining the total number of TDFL entries from the data at the byte positions 1120 to 1151 in the TDDS shown in FIGS. 8A and 8B above.

In the next step S103, on the basis of a pointer in the TDDS, a process for acquiring the TDFL from within the cache data is executed. That is, since the data at the byte positions 1120 to 1151 mentioned above in the TDDS serves as the pointer information of each TDFL, on the basis of PSN information pointed to by this pointer information, a process for acquiring each TDFL from within the cache data is executed.

Then, in the next step S104, it is judged whether or not the number of TDFLs (Kdfl) acquired and the above-mentioned total number of TDFL clusters (Ndfl) match. This is to judge whether or not all the existing TDFLs have been successfully acquired from the cache data in the process of step S103 mentioned above.

In step S104, if Kdfl=Ndfl, and thus a positive judgment result that all the TDFLs have been successfully acquired is obtained, the process proceeds to step S106, where the acquired TDFLs are stored into the second cache area in the cache memory 60a.

On the other hand, in step S104, if Kdfl≠Ndfl, and thus a negative judgment result that not all the TDFLs have been successfully acquired is obtained, the process proceeds to step S105, and a process for acquiring lacking TDFLs is executed by reading those TDFLs from the disc 1. Specifically, on the basis of the TDFL pointer information that has not been successfully acquired in step S103 mentioned above, required component sections are controlled so that those TDFLs are read from the disc 1, and the TDFLs thus read are acquired. Then, the process advances to step S106 mentioned above, where the acquired TDFLs are stored into the second cache area mentioned above.

It should be noted that although not illustrated in the drawing, the same process as the above-mentioned acquisition process for the TDFL is performed with respect to the SRRI as well. It is stated for confirmation that as shown in FIG. 6B mentioned above, there may be cases where the SRRI is not included in the latest TDMS, either. That is, the SRRI does not always exist in the last cluster in the latest TDMS as shown in FIGS. 18A and 18B above but is sometimes stored in the last cluster in a TDMS preceding the latest TDMS.

Accordingly, for the SRRI as well, a process for acquiring the SRRI on the basis of pointer information in the TDDS is similarly executed with respect to the read data cached in step S101, and if SRRI is not acquired as a result, the SRRI is acquired by executing reading from a position pointed to by the above-mentioned pointer information on the disc 1. As a matter of course, if SRRI is acquired from the cache data, then this SRRI is stored into the second cache area as it is.

As described above, according to this embodiment, to acquire the latest management information from the disc 1, rather than reading only the last recorded cluster including the latest TDDS as in the related art, data is read from a predetermined position preceding this cluster. Consequently, only one seek operation is required at minimum for reading the latest management information (TDFL, SRRI). That is, while the related art requires a total of two seek operations, one for acquiring the latest TDDS and one for acquiring the TDFL (and SRRI) on the basis of the latest TDDS information, only one seek operation suffices according to this embodiment. As a result, according to this embodiment, the operation of acquiring the latest management information can be made faster.

While the foregoing description is directed to a case where the disc 1 is a single layer (SL) disc, the management information acquiring process according to this embodiment can be suitably applied also to discs with two layers or more.

FIGS. 20A and 20B show, for the sake of comparison, a case where the maximum possible number of TDFLs are stored in the TDMS in the case of a single layer disc (FIG. 20A), and a case where the maximum possible number of TDFLs are stored in the TDMS in the case of a dual layer (DL) disc (FIG. 20B). It should be noted that in FIGS. 20A and 20B as well, the solid frames in the drawing indicate cluster-based subdivisions, the oblique lines represent a recorded portion, and the blank portion represents an unrecorded portion. In this case as well, for the convenience of description, the latest SRRI exists in the last cluster of the latest TDMS.

First, as shown in FIG. 20A, a maximum of 4 TDFLs can be stored in the TDMS in the case of SL. Specifically, a total of 4 TDFLs, including 3 clusters of TDFL#0 to TDFL#2, and TDFL#3 in the last cluster can be stored.

In contrast, in the case of DL shown in FIG. 20B, a maximum of 8 TDFLs can be stored in the TDMS. That is, 7 clusters of TDFL#0 to TDFL#6, and TDFL#7 in the last cluster can be stored.

That is, since the data recording area is larger in the case of DL, more TDFLs can be stored than in the case of SL.

As can be appreciated by referring to FIGS. 20A and 20B, if the management information acquiring process according to the related art method is performed in the case of DL, the seek distance for reading the TDFL after reading the TDDS tends to become longer than that in the case of SL. That is, the time required for a seek operation tends to become that much longer.

Therefore, by performing the management information acquiring process according to this embodiment in the case of DL, the reduction time length in the case when all the pieces of management information are successfully acquired from cached data can be made longer, so the operation of acquiring the latest management information can be made faster more effectively.

While an embodiment of the present invention has been described in the foregoing, it should not be construed that the present invention is limited to the specific embodiment described above.

For example, while the foregoing description is directed to a case where the present invention is applied to a write-once medium, the present invention can be suitably applied to also a rewritable disc.

Further, while the foregoing description is directed to a case where the present invention is applied to a disc-shaped recording medium, the present invention can be suitably applied also to a recording medium having a shape other than the disc shape. In that case as well, the same effect as that of the above embodiment can be attained.

That is, the present invention can be suitably applied to "a recording medium including a user data recording area where user data can be recorded, and a temporary management information unit recording area where a temporary management information recording unit is sequentially recorded in response to updating of temporary management information that is to be updated in response to recording of data to the user data recording area, the temporary management information recording unit being capable of storing the temporary management information and storing at its end position pointer information pointing to a recording position of the temporary management information".

While the foregoing description is directed to a case where the playback device according to an embodiment of the present invention is connected to the host device, a configuration is also possible in which the playback device is not connected to another equipment. In that case, an operating section or display section is provided, or the configuration of the data input/output interface part differs from that shown in FIG. 17. That is, recording or playback may be performed in accordance with a user's operation, and a terminal section for inputting and outputting various kinds of data may be formed.

While the foregoing description is directed to a case where the playback device according to an embodiment of the present invention is implemented as a recording and playback device that is also capable of recording, as a matter of course, the playback device can be implemented as a playback-only device with no recording capability.

It should be understood by those skilled in the art that various modifications, combinations, sub-combinations and alterations may occur depending on design requirements and other factors insofar as they are within the scope of the appended claims or the equivalents thereof.

What is claimed is:

1. A playback device which performs at least playback from a recording medium including a user data recording area where user data can be recorded, and a temporary management information unit recording area where a temporary management information recording unit is sequentially recorded in response to updating of temporary management information that is to be updated in response to recording of data to the user data recording area, the temporary management information recording unit being capable of storing the temporary management information and storing at its end position pointer information pointing to a recording position of the temporary management information, comprising:
   reading means for performing reading from the recording medium; and
   control means for acquiring the latest version of the temporary management information recorded last on the recording medium, the control means executing
      a read control process of controlling the reading means so that when reading the pointer information in the temporary management information unit recorded last in the temporary management information unit recording area, reading of data is executed from a predetermined position located before a segment in which the pointer information is included, so the temporary management information pointed to by the pointer information is acquired along with the pointer information, and
      an information acquiring process of executing a process for acquiring the temporary management information pointed to by the pointer information from the data read in response to the read control process without performing another read control process.

2. The playback device according to claim 1, wherein if the temporary management information pointed to by the pointer information cannot be acquired from the data read in response to the read control process, the control means executes a re-read control process of controlling the reading means to execute reading of the temporary management information pointed to by the pointer information from the recording medium.

3. A management information acquiring method for acquiring the latest version of temporary management information recorded last on a recording medium, the recording medium including a user data recording area where user data can be recorded, and a temporary management information unit recording area where a temporary management information unit is sequentially recorded in response to updating of the temporary management information that is to be updated in response to recording of data to the user data recording area, the temporary management information unit being capable of storing the temporary management information and storing at its end position pointer information pointing to a recording position of the temporary management information, comprising the steps of:
   executing reading of data from a predetermined position located before a segment in which the pointer information is included, when reading the pointer information in the temporary management information unit recorded last in the temporary management information unit recording area, so the temporary management information pointed to by the pointer information is acquired along with the pointer information; and
   executing a process for acquiring the temporary management information pointed to by the pointer information from the read data without performing a subsequent data reading step.

4. A playback device which performs at least playback from a recording medium including a user data recording area where user data can be recorded, and a temporary management information unit recording area where a temporary management information recording unit is sequentially recorded in response to updating of temporary management information that is to be updated in response to recording of data to the user data recording area, the temporary management information recording unit being capable of storing the temporary management information and storing at its end position pointer information pointing to a recording position of the temporary management information, comprising:
   a reading section that performs reading from the recording medium; and
   a control section that acquires the latest version of the temporary management information recorded last on the recording medium, the control section executing:
      a read control process of controlling the reading section so that when reading the pointer information in the temporary management information unit recorded last in the temporary management information unit recording area, reading of data is executed from a predetermined position located before a segment in which the pointer information is included so the temporary management information pointed to by the pointer information is acquired along with the pointer information, and
      an information acquiring process of executing a process for acquiring the temporary management information pointed to by the pointer information from the data read in response to the read control process without performing another read control step.

* * * * *